US009843062B2

(12) United States Patent
Hotto

(10) Patent No.: US 9,843,062 B2
(45) Date of Patent: Dec. 12, 2017

(54) VORTEX TUBE REFORMER FOR HYDROGEN PRODUCTION, SEPARATION, AND INTEGRATED USE

(71) Applicants: ENERGYIELD LLC, Carlsbad, CA (US); John L. Rogitz, San Diego, CA (US)

(72) Inventor: Robert Hotto, Carlsbad, CA (US)

(73) Assignees: ENERGYIELD LLC, Carlsbad, CA (US), part interest; John L. Rogitz, San Diego, CA (US), part interest ( * ) Notice: Subject to any disclaimer, the term of this patent is extended or adjusted under 35 U.S.C. 154(b) by 119 days.

(21) Appl. No.: 15/078,263

(22) Filed: Mar. 23, 2016

(65) Prior Publication Data

US 2017/0279141 A1 Sep. 28, 2017

(51) Int. Cl.
| | |
|---|---|
| C01B 3/38 | (2006.01) |
| B01J 19/24 | (2006.01) |
| F02C 6/18 | (2006.01) |
| H01M 8/0612 | (2016.01) |
| H01M 8/086 | (2016.01) |
| H01M 8/083 | (2016.01) |
| H01M 8/1011 | (2016.01) |
| H01M 8/04007 | (2016.01) |
| F02M 33/00 | (2006.01) |
| H01M 8/1018 | (2016.01) |

(Continued)

(52) U.S. Cl.
CPC .......... *H01M 8/0618* (2013.01); *F02M 33/00* (2013.01); *H01M 8/04067* (2013.01); *H01M 8/083* (2013.01); *H01M 8/086* (2013.01); *H01M 8/1011* (2013.01); *F01D 5/02* (2013.01); *H01M 2008/1095* (2013.01); *H01M 2008/1293* (2013.01); *H01M 2008/147* (2013.01)

(58) Field of Classification Search
CPC combination set(s) only.
See application file for complete search history.

(56) References Cited

U.S. PATENT DOCUMENTS

| | | |
|---|---|---|
| 3,116,344 A | 12/1963 | Deisler |
| 3,546,891 A | 12/1970 | Fekete |

(Continued)

FOREIGN PATENT DOCUMENTS

WO 2012023858 8/2012

OTHER PUBLICATIONS

"The Vortex-Tube as a Tool in Sustainable Energy Production", STW.nl, Project nummer 10538, 2 pages, http://www.stw.nl/nl/content/vortex-tube-tool-sustainable-energy-production, obtained Mar. 11, 2015.

(Continued)

*Primary Examiner* — Kaity Chandler
(74) *Attorney, Agent, or Firm* — John L. Rogitz

(57) ABSTRACT

A reformer assembly includes a vortex tube receiving heated fuel mixed with steam. A catalyst coats the inner wall of the main tube of the vortex tube and a hydrogen-permeable tube is positioned in the middle of the main tube coaxially with the main tube. With this structure the vortex tube outputs primarily Hydrogen from one end and Carbon-based constituents from the other end. In some embodiments a second vortex tube receives the Carbon output of the first vortex tube to establish a water gas shift reactor, producing Hydrogen from the Carbon output of the first vortex tube.

14 Claims, 11 Drawing Sheets

(51) Int. Cl.
H01M 8/124 (2016.01)
H01M 8/14 (2006.01)
F01D 5/02 (2006.01)

(56) References Cited

U.S. PATENT DOCUMENTS

| | | | |
|---|---|---|---|
| 3,563,883 A | 2/1971 | Westby et al. | |
| 3,636,679 A | 1/1972 | Batta | |
| 3,642,430 A | 2/1972 | Benson | |
| 3,948,224 A | 4/1976 | Knapp et al. | |
| 3,956,903 A | 5/1976 | Hiller et al. | |
| 3,977,850 A | 8/1976 | Hill | |
| 4,059,415 A * | 11/1977 | Kosaka | C01B 3/363 123/3 |
| 4,093,427 A | 6/1978 | Schlenker | |
| 4,235,845 A | 11/1980 | Bose | |
| 4,332,224 A | 6/1982 | Latsch et al. | |
| 4,392,345 A | 7/1983 | Geary | |
| 4,399,107 A | 8/1983 | Bose | |
| 4,455,220 A | 6/1984 | Parker et al. | |
| 4,482,365 A | 11/1984 | Roach | |
| 4,522,159 A | 6/1985 | Engel et al. | |
| 4,531,558 A | 7/1985 | Engel et al. | |
| 4,606,743 A | 8/1986 | Shuman | |
| 4,797,262 A | 1/1989 | Dewitz | |
| 4,798,183 A | 1/1989 | Hataura et al. | |
| 5,193,341 A | 3/1993 | Sibbertsen et al. | |
| 5,391,211 A | 2/1995 | Alliston et al. | |
| 5,409,784 A | 4/1995 | Bromberg et al. | |
| 5,413,227 A | 5/1995 | Diebold et al. | |
| 5,472,463 A | 12/1995 | Herman et al. | |
| 5,507,267 A | 4/1996 | Stuer | |
| 5,558,069 A | 9/1996 | Stay | |
| 6,106,963 A | 8/2000 | Nitta et al. | |
| 6,164,308 A | 12/2000 | Butler | |
| 6,247,460 B1 | 6/2001 | Lindberg et al. | |
| 6,296,820 B1 | 10/2001 | Happrich | |
| 6,354,318 B2 | 3/2002 | Butler | |
| 6,379,411 B1 | 4/2002 | Turner et al. | |
| 6,398,851 B1 | 6/2002 | Bose | |
| 6,521,205 B1 | 2/2003 | Beck | |
| 6,793,698 B1 | 9/2004 | Sanger et al. | |
| 6,810,658 B2 | 11/2004 | Kaupert et al. | |
| 6,823,833 B2 | 11/2004 | Ismailov | |
| 6,843,832 B2 | 1/2005 | Greene et al. | |
| 6,851,398 B2 | 2/2005 | Taylor, III et al. | |
| 6,932,858 B2 | 8/2005 | Nicol et al. | |
| 7,066,973 B1 | 6/2006 | Bentley et al. | |
| 7,086,854 B2 | 8/2006 | Rakhmailov et al. | |
| 7,191,738 B2 | 3/2007 | Shkolnik | |
| 7,220,505 B2 | 5/2007 | Malhotra et al. | |
| 7,241,522 B2 | 7/2007 | Moulthrop et al. | |
| 7,297,324 B2 | 11/2007 | Tegrotenhuis et al. | |
| 7,427,381 B2 * | 9/2008 | Stell | B01D 19/0036 422/177 |
| 7,464,540 B2 | 12/2008 | Easley et al. | |
| 7,575,610 B2 | 8/2009 | Liu et al. | |
| 7,591,242 B2 | 9/2009 | Shih | |
| 7,594,941 B2 | 9/2009 | Zheng et al. | |
| 7,628,144 B2 | 12/2009 | Vetrovec | |
| 7,685,819 B2 | 3/2010 | Vetrovec | |
| 7,707,837 B2 | 5/2010 | Inui et al. | |
| 7,757,866 B2 | 7/2010 | McCutchen | |
| 7,901,485 B2 | 3/2011 | McCutchen | |
| 7,909,013 B2 | 3/2011 | Shkolnik et al. | |
| 8,070,938 B2 | 12/2011 | Stein et al. | |
| 8,078,385 B2 | 12/2011 | Vetrovec | |
| 8,210,214 B2 | 7/2012 | Casey et al. | |
| 8,216,323 B2 | 7/2012 | Liu et al. | |
| 8,220,442 B2 | 7/2012 | Caldwell | |
| 8,257,668 B2 | 9/2012 | Mukai et al. | |
| 8,303,674 B2 | 11/2012 | Tamura et al. | |
| 8,365,699 B2 | 2/2013 | Shkolnik et al. | |
| 8,656,720 B1 | 2/2014 | Hardgrave | |
| 8,663,369 B2 | 3/2014 | Buhrman et al. | |
| 8,667,949 B2 | 3/2014 | Mizuguchi | |
| 8,677,949 B2 | 3/2014 | Bromberg et al. | |
| 8,715,868 B2 | 5/2014 | Weidner | |
| 8,747,496 B2 | 6/2014 | Neels et al. | |
| 8,758,459 B2 | 6/2014 | Johnston | |
| 8,793,981 B2 | 8/2014 | Li | |
| 8,808,425 B2 | 8/2014 | Genkin et al. | |
| 8,858,679 B2 | 10/2014 | Buhrman et al. | |
| 8,863,723 B2 | 10/2014 | Shkolnik et al. | |
| 8,883,360 B2 | 11/2014 | Hong et al. | |
| 8,888,899 B2 | 11/2014 | Chan et al. | |
| 8,936,769 B2 | 1/2015 | Blevins et al. | |
| 8,945,488 B2 | 2/2015 | Bowe et al. | |
| 8,961,625 B2 | 2/2015 | Hartvigsen et al. | |
| 8,966,879 B1 | 3/2015 | Munson | |
| 8,968,432 B2 | 3/2015 | Whyatt et al. | |
| 8,968,433 B2 | 3/2015 | Chandran | |
| 8,986,631 B2 | 3/2015 | Berggren et al. | |
| 8,987,341 B2 | 3/2015 | Early | |
| 8,999,020 B2 | 4/2015 | Raman | |
| 9,012,098 B2 | 4/2015 | Goto et al. | |
| 9,116,528 B2 | 8/2015 | Ukai et al. | |
| 9,140,221 B2 | 9/2015 | Foege | |
| 9,145,298 B2 | 9/2015 | Volpi et al. | |
| 9,156,688 B2 | 10/2015 | Hyde et al. | |
| 9,169,118 B1 | 10/2015 | Bossard | |
| 9,169,778 B2 | 10/2015 | Allam | |
| 9,266,732 B2 | 2/2016 | Park et al. | |
| 2001/0011556 A1 | 8/2001 | Butler | |
| 2002/0040549 A1 * | 4/2002 | Kondo | B01D 53/885 48/61 |
| 2002/0062943 A1 * | 5/2002 | Kondo | B01J 8/04 165/4 |
| 2002/0095916 A1 | 7/2002 | Turner et al. | |
| 2002/0194992 A1 | 12/2002 | Greene et al. | |
| 2004/0013923 A1 | 1/2004 | Molter et al. | |
| 2004/0099614 A1 | 5/2004 | Lehmann et al. | |
| 2005/0045033 A1 | 3/2005 | Nicol et al. | |
| 2005/0166869 A1 | 8/2005 | Shkolnik | |
| 2006/0013759 A1 | 1/2006 | Jiang et al. | |
| 2006/0084022 A1 | 4/2006 | Kruger | |
| 2006/0135630 A1 | 6/2006 | Bowe | |
| 2007/0113476 A1 * | 5/2007 | Thomas | B01B 1/005 48/198.7 |
| 2007/0125346 A1 | 6/2007 | Vetrovec | |
| 2007/0137590 A1 | 6/2007 | Vetrovec | |
| 2007/0277506 A1 | 12/2007 | Easley et al. | |
| 2008/0047239 A1 | 2/2008 | Zheng et al. | |
| 2008/0133110 A1 | 6/2008 | Vetrovec | |
| 2008/0141973 A1 | 6/2008 | Shkolnik et al. | |
| 2008/0251419 A1 | 10/2008 | Stein et al. | |
| 2009/0013867 A1 | 1/2009 | McCutchen | |
| 2009/0022465 A1 | 1/2009 | Chen et al. | |
| 2009/0053562 A1 * | 2/2009 | Maurer | C01B 3/382 429/434 |
| 2009/0060805 A1 | 3/2009 | Muradov et al. | |
| 2009/0065957 A1 * | 3/2009 | Mao | B01F 3/04049 261/78.1 |
| 2009/0068090 A1 * | 3/2009 | Cherry | B01J 19/1806 423/658.2 |
| 2009/0152499 A1 * | 6/2009 | Bartenbach | C01B 3/36 252/373 |
| 2009/0165887 A1 | 7/2009 | Casey et al. | |
| 2009/0259388 A1 | 10/2009 | Vetrovec | |
| 2010/0132153 A1 | 6/2010 | Leibold et al. | |
| 2011/0056457 A1 | 3/2011 | Livshits et al. | |
| 2011/0114057 A1 | 5/2011 | Shkolnik et al. | |
| 2011/0201854 A1 * | 8/2011 | Kocal | C10G 3/45 585/240 |
| 2011/0212090 A1 | 9/2011 | Pedersen et al. | |
| 2011/0219948 A1 | 9/2011 | McCutchen | |
| 2011/0229834 A1 | 9/2011 | Salansky et al. | |
| 2011/0296869 A1 | 12/2011 | Buhrman et al. | |
| 2011/0296986 A1 | 12/2011 | Buhrman et al. | |
| 2012/0034135 A1 | 2/2012 | Risby | |
| 2012/0067214 A1 | 3/2012 | Salcedo | |
| 2012/0111994 A1 | 5/2012 | Kummer et al. | |
| 2012/0125300 A1 | 5/2012 | Caldwell | |

(56) References Cited

U.S. PATENT DOCUMENTS

| | | | |
|---|---|---|---|
| 2012/0216915 | A1 | 8/2012 | Takata et al. |
| 2013/0041049 | A1 | 2/2013 | Bowe et al. |
| 2013/0067905 | A1 | 3/2013 | Eckert |
| 2013/0086884 | A1 | 4/2013 | Michaels-Christopher |
| 2013/0139785 | A1 | 6/2013 | Shkolnik et al. |
| 2013/0149621 | A1* | 6/2013 | McAlister ............ H01M 16/003 429/427 |
| 2013/0213256 | A1* | 8/2013 | McAlister .............. B01J 12/007 105/62.1 |
| 2014/0130756 | A1 | 5/2014 | McAlister |
| 2014/0150753 | A1 | 6/2014 | Foege |
| 2014/0166539 | A1 | 6/2014 | Balepin et al. |
| 2014/0170038 | A1 | 6/2014 | Fischer et al. |
| 2014/0190588 | A1 | 7/2014 | Sloan et al. |
| 2014/0208703 | A1 | 7/2014 | Willems et al. |
| 2015/0024297 | A1* | 1/2015 | Finnerty ................ B01J 19/006 429/423 |
| 2015/0050573 | A1* | 2/2015 | Yoshimine ............ F28D 7/1669 429/425 |
| 2015/0110609 | A1 | 4/2015 | Shkolnik et al. |
| 2015/0119478 | A1 | 4/2015 | Bowe et al. |
| 2015/0144841 | A1 | 5/2015 | Finnerty et al. |
| 2015/0159284 | A1 | 6/2015 | Packer |
| 2015/0252757 | A1 | 9/2015 | McAlister |
| 2015/0291887 | A1 | 10/2015 | Coetzee et al. |
| 2016/0045841 | A1 | 2/2016 | Kaplan et al. |
| 2016/0254557 | A1* | 9/2016 | Finnerty ................ B01J 12/007 429/423 |
| 2017/0174592 | A1* | 6/2017 | Zubrin ................ C07C 29/1518 |

OTHER PUBLICATIONS

"Vorsana—Radial Counterflow Solutions, Post-Combustion Carbon Dioxide Capture", http://www.vorsana.com/co2andairpollution/carboncapture.html, dated Mar. 11, 2015.

"Vorsana Scrubber", Vorsana Radial Counterflow Solutions, obtained Apr. 14, 2015.

"Vorsana Shear Retort", Vorsana Radial Counterflow Solutions, obtained Apr. 14, 2015.

"Vorsana TriPhase Filter", Vorsana Radial Countertlow Solutions, obtained Apr. 14, 2015.

Air Products Advanced Prism Membrane Systms for Cost Effective Gas Separations Prism Separtors brochure obtained Apr. 14, 2015.

Air Products Presentation, obtained Apr. 14, 2015.

Andres Mahecha-Botero, Tony Boyd, Ali Gulamhusein, Nicholas Comyn, C. Jim Lim, John R. Grace, Yoshinori Shirasaki, Ismu Yasuda, "Pure hydrogen generation in a fluidized-bed membrane reactor Experimental findings" Chemical Engineering Science 63 (2008) 2752-2762.

Arian Nijmeijer, "Hydrogen-Selective Silica Membranes for Use in Membrane Steam Reforming" Thesis University of Twente, Enchede The Netherlands 1999.

Ashok Damle, Jim Acquaviva, PALL Corporation, "Membrane Reactor for Hydrogen Production" AIChE 2008 Annual Meeting, Philadelphia, PA; Nov. 17, 2008.

Christian P. Canlas, Junling Lu, Natalie A. Ray, Nicolas A. Grosso-Giordano, Sungsik Lee, Jeffrey W. Elam, Randall E. Winans, Richard P. Van Duyne, Peter C. Stair, Justing M. Notestein, "Shape-selective sieving layers on an oxide catalyst surface", Nature Chemistry 4, 1030-1036, Nov. 9, 2012.

Christina Myers, Henry Pennline, David Luebke, Jeffrey Ilonich, Janeille K. Dixon, Edward J. Maginn, Joan F. Brennecke, "High temperature separation of carbon dioxide/ hydrogen mixtures using facilitated supported ionic liquid membranes" Journal of Membrane Science 322 (2008) 28-31.

Alex C. Hoffman, Louise E. Stein, "Gas Cyclones and Swirl Turbines", Published Jan. 1, 2002, 22 pages.

Doe Hydrogen and Fuel Cells Program, "II.0 Hydrogen Production Sub-Program Overview", FY 2014 Annual Progress Report, II-3-II-10, obtained Apr. 14, 2015.

Doe Hydrogen and Fuel Cells Program, FY 2012 Annual Progress Report, "II.C.2 Process Intensification of Hydrogen Unit Operations Using and Electrochemical Device" obtained Apr. 14, 2015.

Eltron Research & Development, "High Temperature, Hydrogen Separation A Carbon Capture Process Technology", Program Overview Feb. 2011.

Eltron Reserach & Development, "Tech Brief Maximum, Economical $CO_2$ Capture for IGCC Power Plants" technology Readiness Level:4 Component and/or Breadboard Validation in Laboratory Environment, obtained Apr. 14, 2015.

G.Q.Lu, J.C.Diniz Da Costa, M. Duke, S. Giessler, R. Socolow, R.H. Williams, T. Kreutz, "Inorganic membranes for hydrogen production and purification: A critical review and perspective", Journal of Colloid and Interface Science 314 (2007) 589-603.

J.W. Phair, S.P.S. Badwal, "Materials for separation membranes in hydrogen and oxygen production and future power generation" ScienceDirect Science and Technology of Advanced Material 7 (2006) 792-805.

Jean-Yves Saillard and Roald Hoffmann, "C—H and H—H Activation in Transition Metal Complexes and on Surfaces" J. Am. Chem. Soc. 1984, 106, 2006-2026.

Jian-Rong Li, Yuguang Ma, M. Colin McCarthy, Julian Sculley, Jiamei Yu, Hae-Kwon Jeong, Perla B. Balbuean, Hong-Cai Zhou, "Carbon dioxide capture-related gas adsorption and separation in metal-organic frameworks" Coordination Chemistry Reviews 255 (2011) 1791-1823.

Ke Liu, Chunshan Song, Velu Subramani, "Hydrogen and Syngas Production and Purification Technologies" 2010 American Institute of Chemical Engineers.

Pall Pall Corporation, Gas Separation Membrane; obtained Apr. 14, 2015.

Pongjet Promvonge and Smith Elamsa-Ard, "Invesigation on the Vortex Thermal Separation in a Vortex Tube Refrigerator", obtained Apr. 14, 2015.

S.M. Saufi, A.F. Ismail, "Fabrication of carbon membranes for gas separation—a review" Science Direct, Carbon 42 (2004) 241-259.

Sam Wong and Rob Bioletti, "Carbon Dioxide Separation Technologies" Carbon & Energy Management Alberta Research Council, http://www.aidis.org.br/PDF/CARBON%20DIOXIDE%20SEPARATION%20TECHNOLOGIES.pdf, obtained Apr. 14, 2015.

Scott Hopkins, Matthew Keeling, Chuck Love, Keith Rekczis, Kevin Stark and Ashok Damle, "Pall Corporation, Commercialization of Pd Alloy Composite Membranes for Small Scale Hydrogen Generation, Fuel Cell Seminar 2011", Nov. 3, 2011.

Tanvir Farouk, Bakhtier, Farouk, Alexander Gustol, "Simulation of gas species and temperature separation in the counter-flow Ranque-Hilsch vortex tube using the large eddy simulation technique", International Journal of Heat and Mass Transfer 52 (2009) 3320-3333.

Upendra Behera, P.J. Paul, K. Dinesh, S. Jacob, "Numerical investigations on flow behaviour and energy separation in Ranque-Hilsch vortex tube" International Journal of Heat and Mass Transfer 51 (2008) 6077-6089.

William D. Jones and Frank J. Feher, "Comparative Reactivities of Hydrocarbon C—H Bonds with a Transition-Metal Complex", Acc. Chem. Res. 1989, 22, 91-100.

Yue Li, I Fu, Maria Flytani-Stephanopoulos, "Low-Temperature Water-Gas Shift Reaction Over Cu- and Ni-Loaded Cerium Oxide Catalysts", Elservier, Applied Catalysis B: Environmental 27 (2000) 179-191.

Catherine E. Gregorier Padro, Francis Lau, "Advances in Hydrogen Energy", Jan. 1, 2000, 201 pages.

Ceramatec, "Hydrogen Separation/Purification" printed Jan. 8, 2015, http://www.ceramaetec.com/technology/ceramic-solid-state-ionic-technologies/seperation-&-purification-technologies/hydrogen.php.

Kevin T. Taerman, Michael McKeller, Ana Podgorney, Douglas Stacey, Terry Turner, Brian Stokes, John Vranicar, "A Vortex Contractor for Carbon Dioxide Separations", Published May 1, 2001.

(56) References Cited

OTHER PUBLICATIONS

Robert Hotto, "Integrated Reformer and Syngas Separator", file history of related pending U.S. Appl. No. 14/715,026, filed May 18, 2015.

Jacob Leachman, "Kinetic Orthohydrogen-parahydrogen separation to enable small-modular hydrogen liquefaction", Concept Paper DE-FOA-0001002, printed Apr. 28, 2016.

Yue Li, Qi Fu, Maria Flytzani-Stephanopoulos, "Low-Temperature Water-Gas Shift Reaction Over Cu- and Ni-Loaded Cerium Oxide Catalysts", Elservier, Applied Catalysis B: Environmental 27 (2000) 179-191.

Robert Hotto, "Integrated Reformer and Syngas Separator", related pending U.S. Appl. No. 14/715,026, applicant's response filed Nov. 15, 2016 restriction request from examiner dated Nov. 14, 2016.

Robert Hotto, "Integrated Reformer and Syngas Separator", related pending U.S. Appl. No. 14/715,026 non-final office action dated Dec. 2, 2016.

Robert Hotto, "Integrated Reformer and Syngas Separator", related U.S. Appl. No. 14/715,026, Applicant's response to Non-Final Office Action filed Jan. 19, 2017.

Robert Hotto, "Integrated Reformer and Syngas Separator", related pending U.S. Appl. No. 14/715,026 final office action dated May 2, 2017.

\* cited by examiner

On Board Reforming

VORTEX TUBE REFORMER FOR HYDROGEN PRODUCTION, SEPARATION, AND INTEGRATED USE

TECHNICAL FIELD

The present application relates generally to vortex tube reformers for syngas production, hydrogen separation and injection to engines and fuel cells.

SUMMARY

An assembly includes at least one vortex tube having an inlet and a Hydrogen outlet. A reformer mechanism is associated with the vortex tube to remove Hydrogen from Carbon in molecules of hydrocarbon fuel input to the inlet. The reformer mechanism includes a catalytic constituent inside the vortex tube, and/or heated water vapor injected into the vortex tube along with the hydrocarbon fuel.

In example embodiments, the vortex tube includes a swirl chamber, with the inlet of the vortex tube being into the swirl chamber. Also, the vortex tube can include a main tube segment communicating with the swirl chamber and having an outlet different from the hydrogen outlet. A fuel intake of an engine can be in fluid communication with the outlet that is different from the hydrogen outlet of the vortex tube. Furthermore, the outlet that is different from the hydrogen outlet can be juxtaposed with an inside surface of a wall of the main tube segment. A catalytic constituent may be disposed on the inside surface of the wall of the main tube segment.

In some embodiments, a hydrogen-permeable tube is disposed centrally in the main tube segment and defines the hydrogen outlet at one end of the hydrogen-permeable tube.

In some embodiments, plural vortex tubes may be provided and arranged in a toroidal configuration, with a first vortex tube in the plural vortex tubes defining the inlet of the vortex tube and providing fluid to an inlet of a next vortex tube in the plural vortex tubes.

The engine may be a turbine or an internal combustion engine such as a diesel engine.

The inlet of the vortex tube can be in fluid communication with a source of hydrocarbon fuel. In addition or alternatively, the inlet of the vortex tube can be in fluid communication with an exhaust of the engine.

In another aspect, a method includes reforming hydrocarbon fuel using at least one vortex tube. The reforming includes removing Hydrogen from Carbon-based constituents in molecules of the hydrocarbon fuel. The vortex is also used to separate the Hydrogen from the Carbon-based constituents to render a Hydrogen stream substantially free of Carbon. The Hydrogen stream is provided to a hydrogen receiver such as a tank or a turbine or an engine.

In another aspect, an assembly includes at least a first vortex tube configured for receiving hydrocarbon fuel and separating the hydrocarbon fuel into a first stream and a second stream. The first stream is composed primarily of Hydrogen, whereas the second stream includes Carbon such as Carbon-based constituents. At least a first Hydrogen receiver is configured for receiving the first stream. On the other hand, at least a second vortex tube is configured for receiving the second stream from the first vortex tube for separating the second stream into a third stream and a fourth stream. The third stream is composed primarily of Hydrogen for provisioning thereof to the Hydrogen receiver, while the second stream includes Carbon.

The Hydrogen receiver can include a hydrogen tank. In addition or alternatively, the Hydrogen receiver may include a fuel cell. Both the first and third streams may be provided to the Hydrogen receiver. The Hydrogen receiver may include a turbine or other engine.

In some examples, at least one heat exchanger is disposed in fluid communication between the vortex tubes and is configured for removing heat from the second stream prior to the second stream being input to the second vortex tube. In addition or alternatively, at least a first catalytic constituent can be on an inside surface of the first vortex tube and at least a second catalytic constituent can be on an inside surface of the second vortex tube hut not on the inside surface of the first vortex tube. The second catalytic constituent may include Copper, and in specific embodiments Zinc and Aluminum may also be on the inside surface of the second vortex tube.

The details of the present description, both as to its structure and operation, can best be understood in reference to the accompanying drawings, in which like reference numerals refer to like parts, and in which:

DETAILED DESCRIPTION

Figure 1:
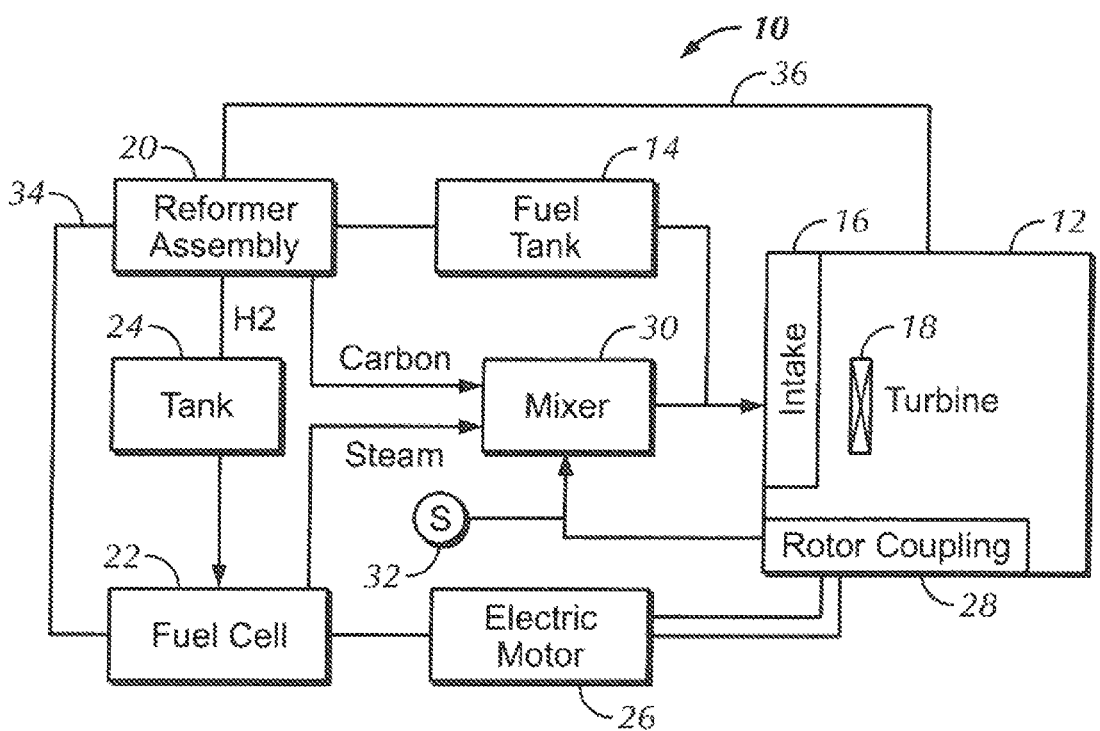
FIG. 1 is a block diagram of an example energy generation system.

FIG. 1 shows an actuation system 10, described further below, that in one example imparts energy to a receiver, such as an engine such as an internal combustion engine for a vehicle or in the example shown by imparting torque to a rotor of a turbine 12 to rotate an output shaft of the turbine. The turbine 12 may include a compressor section, a combustion section, and a turbine section in accordance with turbine principles and may also have one or more rotors or shafts which typically are coupled to each other and which may be concentric to each other.

FIG. 1 shows that in one implementation, a fuel tank 14 which contains hydrocarbon-based fuel such as but not limited to jet fuel can provide fuel to an intake 16 of the turbine 12. The fuel typically is injected through injectors in the turbine, where it mixes with air compressed by the compressor section of the turbine and ignited in a so-called "flame holder" or "can". "Intake" refers generally to these portions of the turbine that are preliminary to the turbine blades. The high-pressure mixture is then directed to impinge on turbine blades 18 which are coupled to the output shaft. In this way torque is imparted to the output shaft to cause it to rotate about its axis. In other implementations the turbine 12 need not be a combustion turbine, and as alluded to above other receivers such as engines in vehicles may be used.

The output shaft of the turbine can be coupled to the rotor of an electrical generator to rotate the generator rotor within an electric held and thus cause the generator to output electricity. Or, the output shaft of the turbine may be coupled to the rotor of an aircraft fan to rotate the fan and thus cause it to generate thrust for propelling a turbofan jet plane. Yet again, the output shaft of the turbine may be coupled to the rotor of a propulsion component such as the rotor of a helicopter, the shaft of a watercraft on which a propeller is mounted, or a drive shaft of a land vehicle such as a military tank to rotate the rotor/shaft/drive shaft as the case may be to propel the platform through the air or water or over land, depending on the nature of the conveyance. The propulsion component may include a drive train that can include a combination of components known in the art, e.g., crankshafts, transmissions, axles, and so on.

In addition to or in lieu of actuating a receiver such as the turbine 12 with fuel directly from the fuel tank 14, the actuation system 10 may include a reformer assembly 20 which receives fuel from the fuel tank 14. While some embodiments of the reformer assembly may include a reformer and a membrane-type hydrogen separator to separate hydrogen in the reformed product of the reformer from the carbon-based constituents, a vortex tube-based reformer assembly is described further below.

The reformer assembly 20 produces hydrogen from the fuel, and the hydrogen is sent to a fuel cell 22, in some cases through a hydrogen tank 24 first as shown. If desired, multiple reformers and/or fuel cells may be used in parallel with each other and/or in series with each other.

The fuel cell 22 uses the hydrogen to generate electricity, typically with a relatively high efficiency, by oxidizing the hydrogen with oxygen from, e.g., the ambient atmosphere. Without limitation, the fuel cell 22 may be a polymer exchange membrane fuel cell (PEMFC), a solid oxide fuel cell (SOFC), an alkaline fuel cell (AFC), a molten-carbonate fuel cell (MCFC), a phosphoric-acid fuel cell (PAFC), or a direct-methanol fuel cell (DMFC).

In turn, electricity from the fuel cell 22 may be sent to an electric motor 26 to cause an output shaft of the motor 26 to turn. The motor shaft is mechanically coupled through a rotor coupling 28 to a rotor of the turbine 12. Typically, the turbine/engine rotor to which the motor 26 is coupled is not the same segment of rotor bearing the blades 18, although in some implementations this can be the case. Instead, the rotor to which the motor 26 may be coupled may be a segment of the blade rotor that does not bear blades or a rotor separate from the blade rotor and concentric therewith or otherwise coupled thereto. In any case, the motor 26, when energized by the fuel cell 22, imparts torque (through appropriate couplings if desired) through a rotor to the output shaft of the turbine 12, which in some cases may be the same shaft as that establishing the rotor. Power from the motor 26 may be provided to components other than the receiver embodied by the turbine. Yet again, the electrical power produced by the fuel cell and turbine/engine may be sent to electrical storage, such as a battery system, or to a power load such as the electrical distribution grid of a municipality.

In addition, to realize further efficiencies, output of the fuel cell such as water in the form of steam produced by the fuel cell 22 may be mixed with hydrocarbon that is input to the reformer assembly 20 in a mixer 30, which may be a tank or simple pipe or other void in which the water and carbon can mix, with the mixture then being directed (through, e.g., appropriate piping or ducting) to the turbine intake 16. If desired, surfactant from a surfactant tank 32 may also be added to the steam/carbon mixture. Or, the steam from the fuel cell may be sent to the reformer assembly described below without mixing the steam with carbon and/or without mixing the steam with surfactant.

In any case, it may now be appreciated that the steam/carbon mixture may supplement fuel injection directly from the fuel tank 14 to the intake 16, or replace altogether fuel injection directly from the fuel tank 14 to the intake 16.

Still further, electricity produced by the fuel cell 22 may be used not only to actuate the electric motor 26 (or provide power to a battery storage or the grid) but also to provide ignition current for the appropriate components in the turbine or engine 12. Also, electricity from the fuel cell may be used for other auxiliary purposes, e.g., in addition to actuating the electric motor, powering other electrical appliances. In cases where the reformer assembly 20 generates carbon dioxide and steam, these fluids may also be directed to heat exchangers associated with or coupled to the reformer and a steam generator.

In some embodiments, water can be returned from the fuel cell 22 if desired to the reformer assembly 20 through a water line 34. Also if desired, heat from the receiver (e.g., from the turbine 12) may be collected and routed back to the reformer assembly 20 through ducting/piping 36, to heat the reformer assembly.

Figure 2:
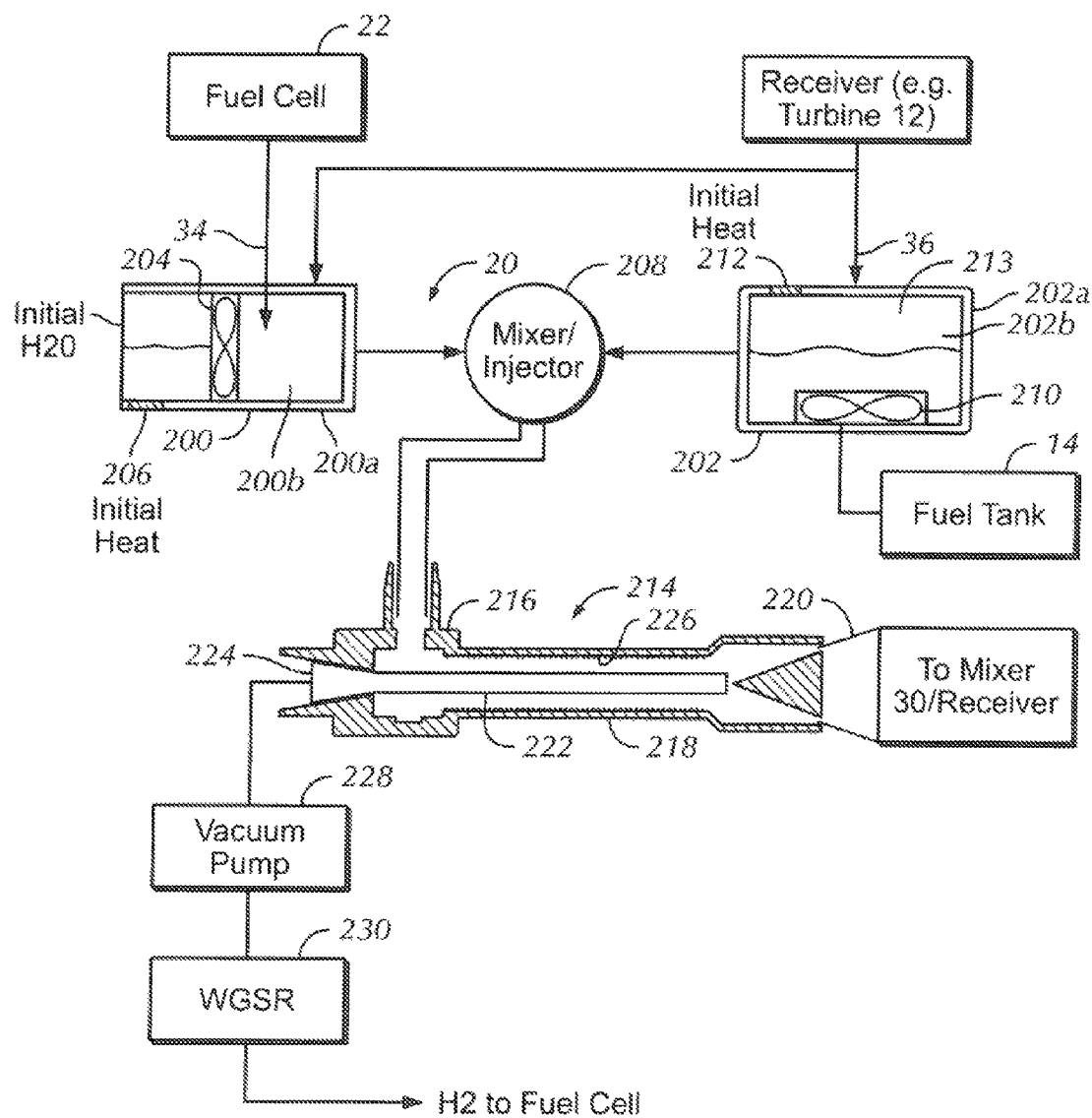
FIG. 2 is a block diagram of an example vortex tube reformer/separator assembly.

FIG. 2 illustrates a vortex tube-based reformer assembly 20. As shown, the assembly 20 may include a steam reservoir 200 and a fuel reservoir 202. The steam reservoir 200 and fuel reservoir 202 may be heat exchangers, schematically depicted by illustrating a respective outer heating chamber 200a, 202a surrounding a respective inner fluid chamber 200b, 202b, with the heat in each outer heat exchange chamber heating the fluid in the respective inner fluid chamber. Heat may be supplied to each heat exchange chamber 200a, 202a via the exhaust line 36 from the exhaust of the receiver of FIG. 1, e.g., the turbine 12.

First considering the steam reservoir 200, initial water or steam for startup may be supplied to the intake side of an optional impeller 204 or other fluid movement device until such time as the initial water or steam may be supplemented and preferably superseded by steam exhaust from the fuel cell 22 via the line 34 as shown. Initial startup heat may also be provided, e.g., from an electric heating element 206 in the heat exchange chamber 200a of the fluid reservoir 200, from exhaust heat from the turbine or engine, or from some other source of heat until such time as the startup heat may be supplemented and preferably superseded by exhaust heat from the receiver (e.g., turbine 12) via the exhaust line 36 as shown. In any case, the initial water heated into steam for startup and the steam from the fuel cell during operation are sent to a mixer/injector reservoir 208, under the influence of the impeller 204 when provided or simply under steam pressure within the inner fluid chamber 200b.

With respect to the fuel reservoir 202, hydrocarbon fuel such as hut not limited to natural gas may be supplied from the fuel tank 14 to the intake side of an optional impeller 210 or other fluid movement device. Initial startup heat may also be provided, e.g., from an electric heating element 212 in the heat exchange chamber 202a of the fuel reservoir 202 or from some other source of heat until such time as the startup heat may be supplemented and preferably superseded by exhaust heat from the receiver (e.g., turbine 12) via the exhaust line 36 as shown. In any case, the heated fuel in the fluid chamber 202b of the fuel reservoir 202, preferably scrubbed of sulfur by desulfurizer sorbent elements 213 that may be provided on the inside wall of the fuel chamber, is sent to the mixer/injector reservoir 208, under the influence of the impeller 210 when provided or simply under fluid pressure within the inner fluid chamber 202b. In some case, the fuel may not be heated prior to provision to the mixer/injector 208.

In some examples, the steam in the steam reservoir 200 and/or fuel in the fuel reservoir 202 may be heated to six hundred degrees Celsius (600° C.) to one thousand one hundred degrees Celsius (1100° C.) at a pressure of three atmospheres to thirty atmospheres (3 atm-30 atm). More generally, the reaction temperatures applied to the hydrocarbon and steam mixtures can proceed from a low temperature of 300 C up to 1200 C. These temperatures can be optimized for the input hydrocarbon feed type, the duty transit time of the process through the reaction tube, and the applied pressures caused by the turbulent flow such the vortex generated in the reaction tube.

The mixer/injector 208 mixes the steam from the steam reservoir 200 with the fuel from the fuel reservoir 202. The mixing may be accomplished under the influence of the turbidity of the respective fluids as they enter the mixer/injector 208 and/or by additional mixing components such as rotating impellers within the mixer/injector 208 and/or by other suitable means. The mixer/injector 208 injects the mixed steam and fuel into a vortex tube 214, e.g., through fuel injectors or simply through a port and fluid line under the influence of fluid pressure within the mixer.

The vortex tube 214, which also may be known as a Ranque-Hilsch vortex tube, is a mechanical device that separates a compressed fluid into hot and cold streams. It typically has no moving parts.

As shown, the pressurized mixture of steam and fuel from the mixer/injector 208 is injected, preferably tangentially, into a swirl chamber 216 of the vortex tube 214, and accelerated to a high rate of rotation by the cooperation of geometry between the swirl chamber 216 and cylindrical wall of a main tube segment 218 that is oriented perpendicular to the input axis of the swirl chamber 216 as shown. A first conical nozzle 220 may be provided at one end of the vortex tube 214 so that only the outer shell of the compressed gas is allowed to escape at that end. The opening at this end thus is annular with its central part blocked (e.g., by a valve as described further below) so that the remainder of the gas is forced to return back through the main inner tube 218 toward the swirl chamber 216 in an inner vortex of reduced diameter that is substantially coaxial with the main tube segment 218 as shown. In one embodiment, the inner vortex can be enclosed in a hydrogen-permeable tube 222 that leads to a hydrogen output 224, which may be established by a second conical nozzle. The hydrogen-permeable tube 222, when provided, preferably is impermeable to carbon-based constituents. The tube 222 may include Palladium.

A catalyzing layer 226 may be formed on or made integral with the inside surface of at least the main inner tube 218 to attract carbon-based constituents to the outer circumference of the passageway formed by the main inner tube. The catalyzing layer may include nickel and/or platinum and/or rhodium and/or palladium and/or gold and/or copper. The tube 218 may be composed of the catalyzing layer or the layer 226 may be added to a tube substrate as by, e.g., vapor deposition of the catalyzing layer 226 onto the tube substrate, which may be ceramic.

The cooperation of structure of the vortex tube 214 forces relatively cooler hydrogen from the input fuel toward the axis of the main tube 218 into the hydrogen-permeable tube 222 when provided, and left looking down at FIG. 2 along the axis of the main tube 218, while forcing the relatively heavier and hotter carbon-based constituents of the fuel outward against the catalytic layer 226 and right looking down at FIG. 2. Owing to the cooperation of structure depicted, the fuel is both chemically reformed into hydrogen and carbon-based constituents and the hydrogen is physically separated from the carbon-based constituents for provisioning to the fuel cell 22.

If desired, an evacuation mechanism such as a vacuum pump 228 may be provided to aid in withdrawing hydrogen from the hydrogen output 224 of the vortex tube 214. Also, if desired the hydrogen may be passed through a water gas shift reactor (WSGR) 230 to further purify the hydrogen, prior to provisioning to the fuel cell 22. Examples of vortex tube-based WGSR embodiments are discussed further below.

On the other hand, the carbon-based constituents of the fuel are sent out of the right side of the main tube 218 of the vortex tube 214 to the receiver, e.g., the turbine 12, in some cases via the mixer 30 shown in FIG. 1.

Fuel cells typically work better when the hydrogen input to them is relatively cooler than that produced by conventional reformers, which consequently may require cooling. Moreover, it may be difficult to employ certain hydrogen cooling techniques such as WGSR with extremely high temperature hydrogen from a conventional reformer, meaning the hydrogen may require significant cooling. By reforming the fuel, separating the hydrogen, and cooling the hydrogen (relative to the carbon-based constituents) in a single reformer assembly as described herein, multiple benefits accrue, including the ability to produce relatively cool hydrogen which requires less post-reforming cooling and which extends the life of the fuel cell.

Accordingly, the application of vortex or cyclonic swirling action enables the elegant integration of these processes and provides higher energy efficiency, improved fuel utilization, and increased hydrogen yield. Additional advantages over conventional reformers include shifting of the chemical equilibrium to favor hydrogen production. This is achieved by the placement of a hydrogen permeable membrane separator tube at the low-pressure site of the vortex to pull or harvest hydrogen from the evolving hydrocarbon syngas mixture during the reforming process in the tube. This process is achieved through the combination of a generated vortex or vortexes, which, enhances the reforming and vertex gas separation simultaneously while also enhancing the harvesting and cooling of the hydrogen gas.

In the approach described above, the generated vortex provides centrifugal spinning action which is applied to the gases in a circular tube, initially to the hydrocarbon and steam, which tangentially presses at higher pressures and temperatures against the walls of the catalyst-lined main tube 218, enhancing the rate of reforming. This is due to the higher temperatures and pressures on the on the more massive molecular gases (the hydrocarbons and steam) imposed by the swirling motion contacting the walls of the catalyst lined tube.

As the reforming process proceeds down the tube in the vortex, the input hydrocarbon gas mixture differentiates or stratifies axially in the tube according to gas densities. The hydrocarbons and the steam being the densest congregate at the inside wall of the tube and the hydrogen having the lowest density will move towards the center of the vortex.

The higher momentums are imparted to the heavier gases, the longest chain hydrocarbons and the steam, which collide with high force and in high densities with the catalyst-lined wall of the tube. This optimizes compliance and the interface between the hydrocarbon, the steam and the catalyst for a given pressure.

The hydrogen gases, which are less massive, are pulled toward the center of the vortex, toward the lower pressure zone, away from the peripheral. This effect, moving the hydrogen away from the peripheral, improves the access path to the catalyst for the heavier hydrocarbons, steam, and carbon oxides. The center of the tube, where the vortex has its lowest pressures, contains the hydrogen permeable filter tube 222 with suction for pulling hydrogen. Therefore hydrogen permeates in to the center and is drawn off from the reaction with a negative pressure, thereby harvesting the hydrogen while the reforming process proceeds.

The hydrogen is separated and drawn to the center of the vortex due to its lower density and it is further drawn into the walls of the hydrogen permeable separation tube due to the negative pressure applied to the tube. The drawing off or harvesting of hydrogen from the ongoing reforming further improves the dynamic chemical reactions in conjunction with catalyst by depleting hydrogen, limiting unfavorable hydrogen reversible reactions. This increases the hydrogen to carbon production ratio.

With the above in mind, the product of the reformation reaction (syngas) is continually tapped during the transit time along the vortex tube providing the purified output streams and further changing the equilibrium balance of the ongoing reaction to improve the amount of hydrogen produced. The vortex cyclonic action may be applied to the injected hydrocarbon and steam feeds by means of propeller, or pump which a causes the heavy hydrocarbon base gases and steam towards the tube walls. This action causes reforming of some of the hydrocarbons impinging on the catalysts, ejecting hydrogen and carbon monoxide. These two gases being lighter than the CH4 are propelled towards the center of the vortex away from the wall of the vortex tube. The separated output streams consisting of hydrogen on the one hand and steam, carbon monoxide, carbon dioxide, and trace impurities on the other are individually tapped and fed to respective output streams.

The production and the separation of the output fuels streams are both enhanced by means of the vortex action in the reaction tube and the progressive removal of the fractional products, such as hydrogen, which further provides dynamic optimization doe to the continuous non equilibrium conditions.

In addition to appropriate sensors, valves, and controller electronics, the vortex tube may include fuel and steam injectors, heating inputs, heat exchangers, high shear turbulent mixers, filters, and output stream taps. The output hydrogen and some steam can be fed to the fuel cell 22, with carbon-based constituents and some steam being fed to the receiver. In some implementations most of the steam and heavier fractional hydrocarbons can be fed back into the vortex tube or a plurality of vortex tubes.

Figure 3:
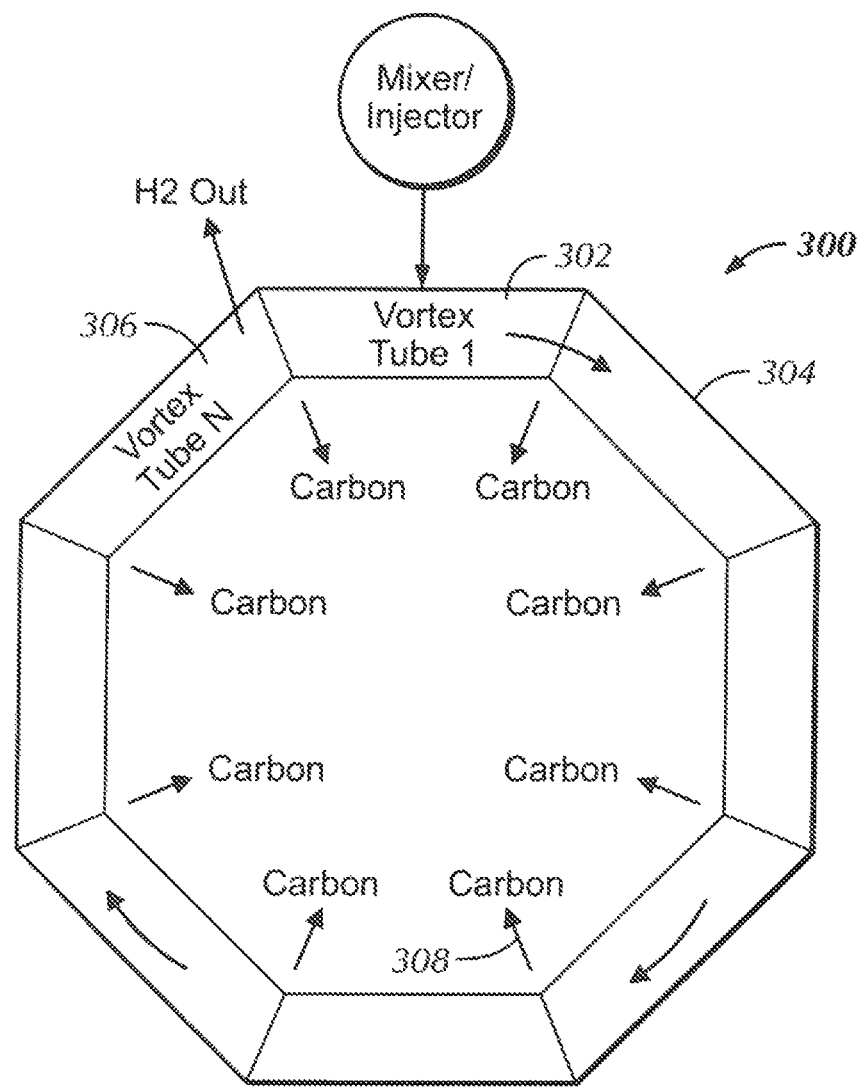
FIG. 3 is a schematic diagram of a toroidal vortex tube assembly.

FIG. 3 illustrates an embodiment in which plural vortex tubes are arranged in an endless loop 300, referred to herein as a "toroidal" configuration without implying that the endless loop is perfectly round. Each vortex tube may be substantially identical in construction and operation to the vortex tube 214 in FIG. 2.

As shown, fuel may be input to an initial vortex tube 302, the hydrogen output from the hydrogen permeable tube of which is sent as input to the swirl chamber of the next vortex tube 304, whose hydrogen output in turn is provided as input to the next vortex tube. "N" vortex tubes may this be arranged in series in the configuration 300, with "N" being an integer (in the example shown, N=8) and with the hydrogen output of the $N^{th}$ vortex tube 306 being sent to the fuel cell 22. In this way, the hydrogen is successively separated into ever-more-pure input for the fuel cell, while the carbon-based constituents output from each vortex tube can be individually withdrawn from each tube and sent to the receiver, as indicated by the "N" arrows 308.

The configuration 300 of FIG. 3 may be used in the system shown in FIG. 2, with the initial vortex tube 302 receiving fuel from the mixer/injector 208 and sending hydrogen from the hydrogen output 224 to the swirl chamber input of the next vortex tube, and with the hydrogen output of the $N^{th}$ vortex tube 306 being sent to the fuel cell 22 via the vacuum pump 228 and WSGR 230. Carbon-based constituents from each vortex tube of FIG. 3 may be sent to the mixer/receiver 30/12.

In other embodiments, the carbon output of each tube is sent to the input of the next tube with the hydrogen outputs of each tube being individually directed out of the toroidal configuration 300 and sent to the fuel cell.

Figure 4:
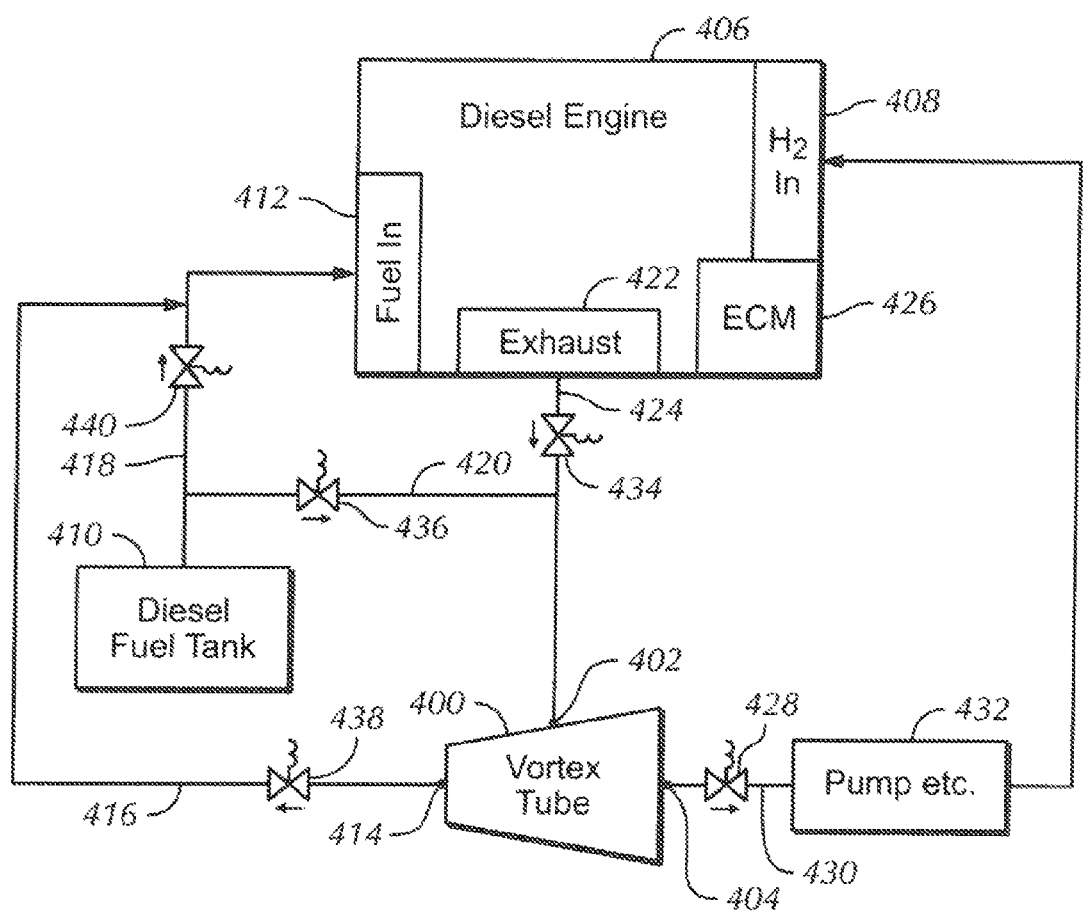
FIG. 4 is a schematic diagram of a vortex tube in an engine system.

FIG. 4 illustrates a vortex tube 400 that may be established by a vortex tube or tubes described above and shown in FIG. 2 or 3. The vortex tube 400 of FIG. 4 may include at least one inlet 402 at least one hydrogen outlet 404 as shown, with at least one engine 406 such as a diesel engine having an input port 408 in fluid communication with the hydrogen outlet 404 of the vortex tube 400. In this way, hydrogen produced by the reforming within the vortex tube 400 is provided as hydrogen injection or enhancement to the engine 406, in which the hydrogen may be combined with diesel fuel from a tank 410 and received at a fuel intake 412 of the engine. Note that the hydrogen inlet 408 of the engine 406 may be separate from the fuel intake 412 or it may be the same or in the same mechanical assembly as the fuel intake 412.

It will be appreciated in light of preceding disclosure that the vortex tube 400 may typically include a swirl chamber into which hydrocarbon is provided through the inlet 402 and a main tube segment communicating with the swirl chamber and having an outlet 414 that is different from the hydrogen outlet 404. In some embodiments such as the one illustrated, the fuel intake 412 of the engine 406 is in fluid communication with the outlet 414 to receive hydrogen-depleted reformate from the vortex tube 400. According to the above disclosure, the outlet 414 typically is juxtaposed with an inside surface of a wall of the main tube segment, onto which at least one catalytic constituent may be disposed.

Likewise, the vortex tube 400, as described above in the case of the preceding vortex tubes, may include a hydrogen-permeable tube disposed centrally in the main tube segment and defining the hydrogen outlet 404 at one end of the hydrogen-permeable tube.

As mentioned above, the vortex tube 400 in FIG. 4 may represent an assembly established by the plural vortex tubes arranged in a toroidal configuration of FIG. 3.

In the example shown, a vortex tube outlet conduit 416 communicates with the vortex tube outlet 414 to convey hydrogen-depleted reformate to an engine fuel supply conduit 418 that connects the fuel tank 410 to the fuel intake 412 of the engine. In this way, only a single input opening need be provided in the fuel intake. However, in alternate embodiments the vortex tube outlet conduit 416 extends from the vortex tube outlet 414 directly to the fuel intake 412 of the engine 406 without joining the fuel supply conduit 418.

In the example shown, the inlet 402 of the vortex tube 400 can be in fluid communication with the fuel tank 410 through a fuel tank supply conduit 420, to receive hydrocarbon fuel to be reformed. In addition or alternatively, the inlet 402 of the vortex tube 400 may be in fluid communication with the exhaust system 422 of the engine 406 to receive, through a vehicle exhaust conduit 424, a hydrocarbon stream to be reformed. In the example shown, when two sources of hydrocarbon to be reformed are provided (engine exhaust and fuel tank), the vehicle exhaust conduit 424 can join the fuel tank supply conduit 420 so that only a single inlet opening need be provided in the vortex tube 400. However, in alternate embodiments using two vortex tube input sources, the vehicle exhaust conduit 424 can extend from the vehicle exhaust 422 directly to the inlet 402 and similarly the fuel tank supply conduit 420 can extend from the fuel tank 410 directly to the inlet 402.

FIG. 4 also illustrates optional valves that are depicted in FIG. 4 as being electronically-operated valves that can be controlled by the engine control module (ECM) 426 of the engine 406 (typically a component of the engine 406 but not housed within combustion portions of the engine 406). Alternatively, one or more of the valves shown may be check valves that permit one-way flow only in the directions indicated by the respective arrows next to the respective valves.

In greater particularity, a hydrogen outlet valve 428 may be disposed in a hydrogen outlet conduit 430 that extends from the hydrogen outlet 404 of the vortex tube 400. In the example shown, the hydrogen outlet valve 428 is upstream of an outlet assembly 432 that may include, e.g., the pump 228 and WGSR 230 shown in FIG. 2. In other embodiments the hydrogen outlet valve 428 may be downstream of the assembly 432.

An engine exhaust vortex tube supply valve 434 may be provided in the vehicle exhaust conduit 424 as shown, preferably upstream of where the fuel tank supply conduit 420 joins the exhaust conduit 424. Likewise, a fuel tank vortex tube supply valve 436 may be provided in the fuel tank supply conduit 420. The vortex tube supply valves 434, 436 may be controlled by the ECM 426 to selectively control which source or sources of hydrocarbon are provided to the vortex tube 400.

To control what fuel is received by the engine 406, first and second engine supply valves 438, 440 may be respectively provided in the vortex tube outlet conduit 416 and fuel supply conduit 418. In the non-limiting example shown, the second engine supply valve 440 in the fuel supply conduit 418 is provided downstream of where the fuel tank supply conduit 420 that provides fuel to the vortex tube taps into the fuel supply conduit 418, so that the second engine supply valve 440 and the fuel tank vortex tube supply valve 436 can be shut to isolate their respective conduits as desired without affecting the other conduit.

It may now be appreciated that in operation, the vortex tube 400 reforms hydrocarbon fuel and/or exhaust from an engine, separating hydrogen from carbon-based constituents during the reforming, with hydrogen separated as a result of the reforming being provided to the engine 406.

Figure 5:
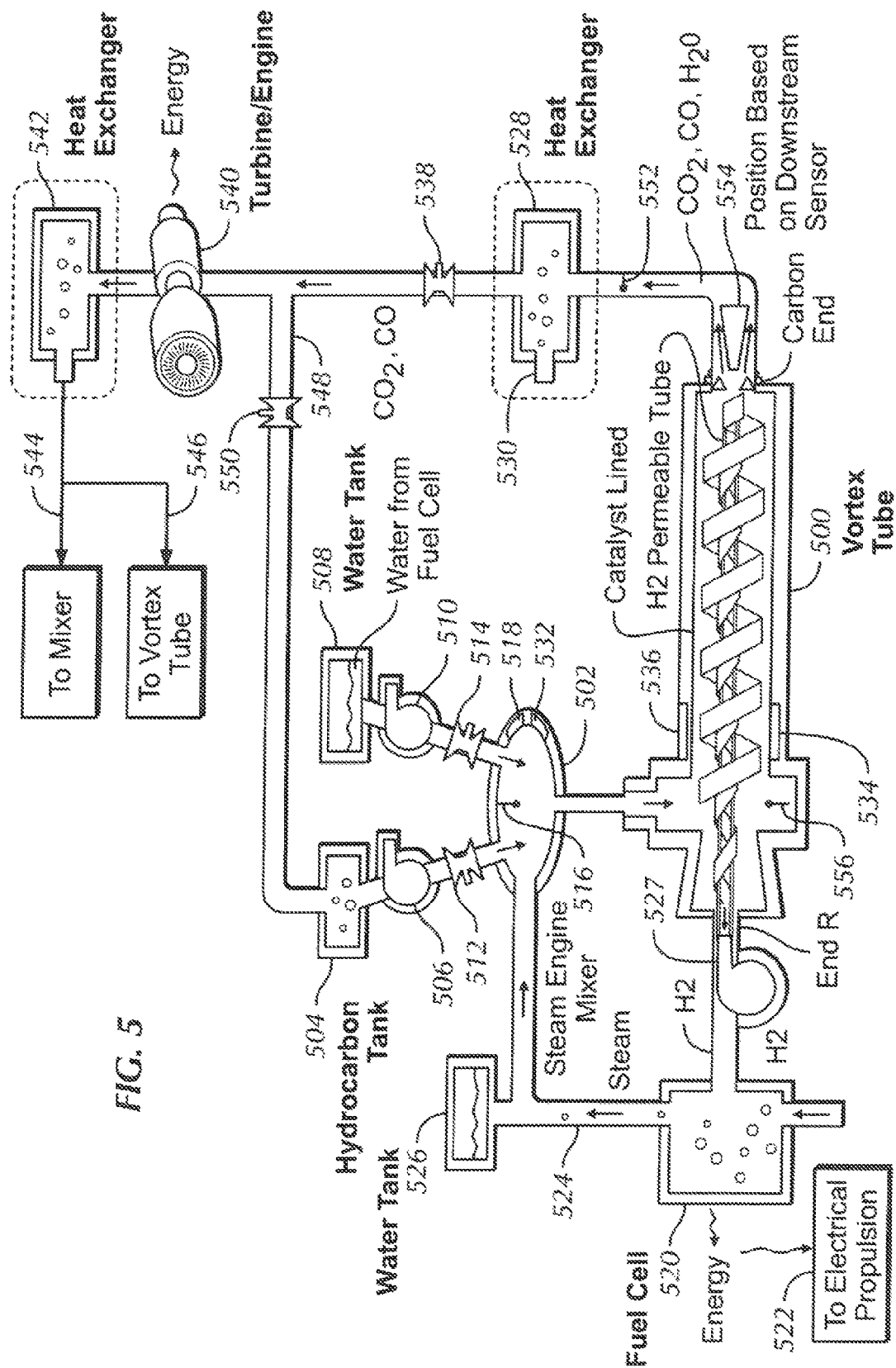
FIG. 5 is a schematic diagram of a vortex tube-based Hydrogen-injection system for an engine.

FIG. 3 shows a specific system in which the discussion above is incorporated. A vortex tube 500 receives, through a mixer 502, hydrocarbon fuel such as gasoline or diesel from a fuel tank 504, e.g., from the gas tank of a vehicle in which the system shown in FIG. 5 is disposed. Any of the above-described vortex tubes may be used.

The steam mixer/injector 502 mixes the steam with the hydrocarbon and injects the mixture at a high-pressure into the vortex tube inlet. Located behind the vortex inlet is the vortex generator established by the vortex tube 500, which causes the input mixture to swirl at a high rate and travel (right, looking down on FIG. 5) toward the Carbon end of the tube 500, swirling along the inside peripheral of the tube at a high rate, pressure, and temperature in contact with the catalyst coating the inside surface of the tube as described above for the catalyzing layer 226 in FIG. 2. This swirling action of the syngas causes the mixture closest to the outer periphery of the interior chamber of the vortex tube 500 to both increase in temperature and to apply high centripetal forces to the catalyst lining inside the tube, increasing the reforming reaction rate and preventing carbon buildup on the catalyst.

During the reforming process, syngas is generated at the catalyzing layer, and the Hydrogen component of the syngas then moves toward the center of the swirl in the vortex tube since the Hydrogen is lighter than the carbon/steam mixture, which is urged toward the outer part of the swirl. Thus, one output stream of the vortex tube is composed primarily of Hydrogen, and is output (if desired, through intervening components such as the below-described pump 527) to a Hydrogen receiver, such as a Hydrogen tank or, in the non-limiting example shown, a fuel cell 520. The second output of the vortex tube includes primarily Carbon-based constituents and in some cases water and residual Hydrogen.

A fuel pump 506 may be provided with a suction on the fuel tank 504 and discharge into the mixer 502 to pump fuel into the mixer 502. Also, the vortex tube 500 receives, through the mixer 502, water or steam, from a water tank 508. A water pump 510 may be provided with a suction on the water tank 508 and discharge into the mixer 502 to pump water into the mixer 502. Thus, the vortex tube may receive a mixture of fuel and water from the mixer 502.

A fuel line valve 512 may be provided in the communication path between the fuel tank 504 and mixer 502. Likewise, a water line valve 514 may be provided in the communication path between the water tank 508 and the mixer 502. In general, the valves herein may be processor-controlled and thus may include solenoids. An example processing circuit is described further below.

The position of one or both valves 512, 514 may be established based on signals from one or more mixer sensors 516 (only a single sensor shown for clarity). The mixer sensor(s) 516 may be one or more of a fuel sensor or Oxygen sensor or Carbon sensor or temperature sensor or pressure sensor other appropriate sensor that senses the composition (and/or temperature and/or pressure) of the mixture within the mixer 502. For example, if the ratio of water to fuel is too high, the fuel valve 512 may be caused to open one or more valve position increments and/or the water valve may be caused to shut one or more increments. Similarly, if the ratio of water to fuel is too low, the fuel valve 512 may be caused to shut one or more valve position increments and/or the water valve may be caused to open one or more increments.

Furthermore, heat may be applied to the mixer 502 as shown at 518, and when the sensor 516 includes a temperature sensor, the signal from the sensor can be used to adjust the heat input to optimize the temperature of the mixture in the mixer 502. The heat application 518 may be an electrical heater thermally engaged with the mixer 502 and/or a conduit for conducting heat from the below-described heat exchanger to the mixer 502.

At its hydrogen output end, the vortex tube 500 outputs Hydrogen to a fuel cell 520. The fuel cell 520 may be used to provide electricity to an electric propulsion motor 522 in the vehicle. The fuel cell 520 may also output water via a line 524 to a water tank 526 and/or direct to the previously-described water tank 508 and/or directly into the mixer 502 as shown. A Hydrogen pump 527 may be provided with a suction on the vortex tube 500 and a discharge into the fuel cell 520.

At its Carbon output end, the vortex tube 500 may output water as well as Carbon-based constituents including Carbon Monoxide (CO) and Carbon Dioxide ($CO_2$) to a first heat exchanger 528. The first heat exchanger may warm or cool the fluid supplied to it using a water circulation pump pumping water from any of the water tanks described herein through a water jacket or using air cooling. Heat from the fuel cell 520 and/or any of the engines in the system may be applied to the heat exchanger to heat it. Heat from the first heat exchanger may be provided through an outlet 530 to one or more of the components shown herein, e.g., to a heat element 532 of the mixer 502 and/or to heating element 534 thermally engaged with the vortex tube 500 nearer the Hydrogen end than the Carbon end. Note that an electric heater 536 also may be thermally engaged with the vortex tube 500 for providing heat thereto until such time as one of the heat exchangers herein is warm enough to supply heat to the vortex tube 500.

Output from the heat exchanger 528 may be supplied, through an outlet control valve 538 to an engine 540, which may be implemented by a turbine, a diesel engine, or a gasoline engine to propel the vehicle. A second heat exchanger 542 may be provided to extract heat from the engine 540, with heat from the second heat exchanger 542 being supplied as necessary to one or more of the mixer 502 and vortex tube 500 through respective conduits 544, 546. Note that the first and second heat exchangers 528, 542 may be combined into a single unit if desired.

Also, some output from the fuel, tank 504 may flow through a fuel line 548 in which a hydrocarbon valve 550 may be provided to provide fuel to the engine 540 in a startup mode. In the startup mode the valve 550 is opened, connecting the hydrocarbon tank to the engine/turbine to supply fuel and startup the engine/turbine, which in tarn supplies heat to the heat exchanger, which in turn heats up the vortex tube-based reformer/separator structure shown.

One or more sensors 552 may be provided to sense parameters in the output of the Carbon end of the vortex tube 500. These one or more sensors may sense temperature, $CO_2$, CO, water, Hydrogen etc. and may input signals to a processor to control a throttle control valve 554 in the Carbon outlet of the vortex tube 500 upstream of the sensor(s) 552 as necessary to ensure parameters may stay within predetermined ranges.

With greater specificity, at the Carbon end of the vortex tube 500, the swirling syngas encounters the partial blockage created by the throttle control valve 554. The position of the throttle control valve 554 may be adjusted by the below-described processor based on one or more input signals from the sensors described herein such that the heavier carbon-rich mixture passes through the peripheral gap of the control valve 554. In an example, the below-described processor determines, from sensor signals, the hydrogen/carbon ratio and adjusts the position of the throttle control valve 554 accordingly.

On the other hand, the center of the syngas swirl, mostly Hydrogen, is reflected off of the center of the throttle control valve 554. This prevents the Hydrogen from escaping through the valve 554 and to travel back (left, looking down on FIG. 5) toward the Hydrogen end of the vortex tube 500, where it exits the tube and is input into the fuel cell 520. The hydrogen stream, which is concentrated at the center of the vortex tube, exits the vortex tube at a lower temperature than both the peripheral swirl and the initially injected hydrocarbon steam mixture. This lower temperature hydrogen is well suited for use in the fuel cell.

Similarly, one or more sensors 556 may be provided to sense parameters in the Hydrogen output of the vortex tube. These one or more sensors 556 may sense temperature, $CO_2$, CO, water, Hydrogen etc. and may input signals to a processor to control one or more of the valves or other components herein as necessary to ensure parameters may stay within predetermined ranges. Thus, temperature within the vortex tube 500 may be sensed through a temperature sensor and can be regulated by the below-described processor to maintain proper temperature for reforming.

It may now be appreciated that FIG. 5 illustrates an integrated vortex tube-based reformer and hydrogen separator connected to a fuel cell 520 and to an engine/turbine 540 to establish a hybrid fuel cell turbine. The structure of FIG. 5 provides the capability of immediately starting up for a vehicle such as a car or truck having onboard reforming by means of porting fuel from the tank 504 through the line 548 to the engine 540. In this instance, when the system is cold, the engine/turbine 540 is powered up first by means fuel ported through the valve 550 so that the vehicle can operate immediately and in turn heat up the reformer separator prior to switching to hydrogen operation.

Once warm enough to operate in the hydrogen operating mode, the generated hydrogen stream from the vortex tube 500 is supplied to the fuel cell 520, and the Carbon stream from the vortex tube 500 is supplied to the turbine/engine 540. The system of FIG. 5 includes two front end supply tanks, namely, the water tank 508 and hydrocarbon tank 504 that supply product to the steam mixer/injector 502 via the above-described control valves 512, 514. These control valves 512, 514 advantageously may be regulated based on sensed parameters, such as power demand and reaction rates, temperatures, gas mixtures sensed by the sensors shown in FIG. 5 and controlled by the processor shown and described below.

Figure 6:
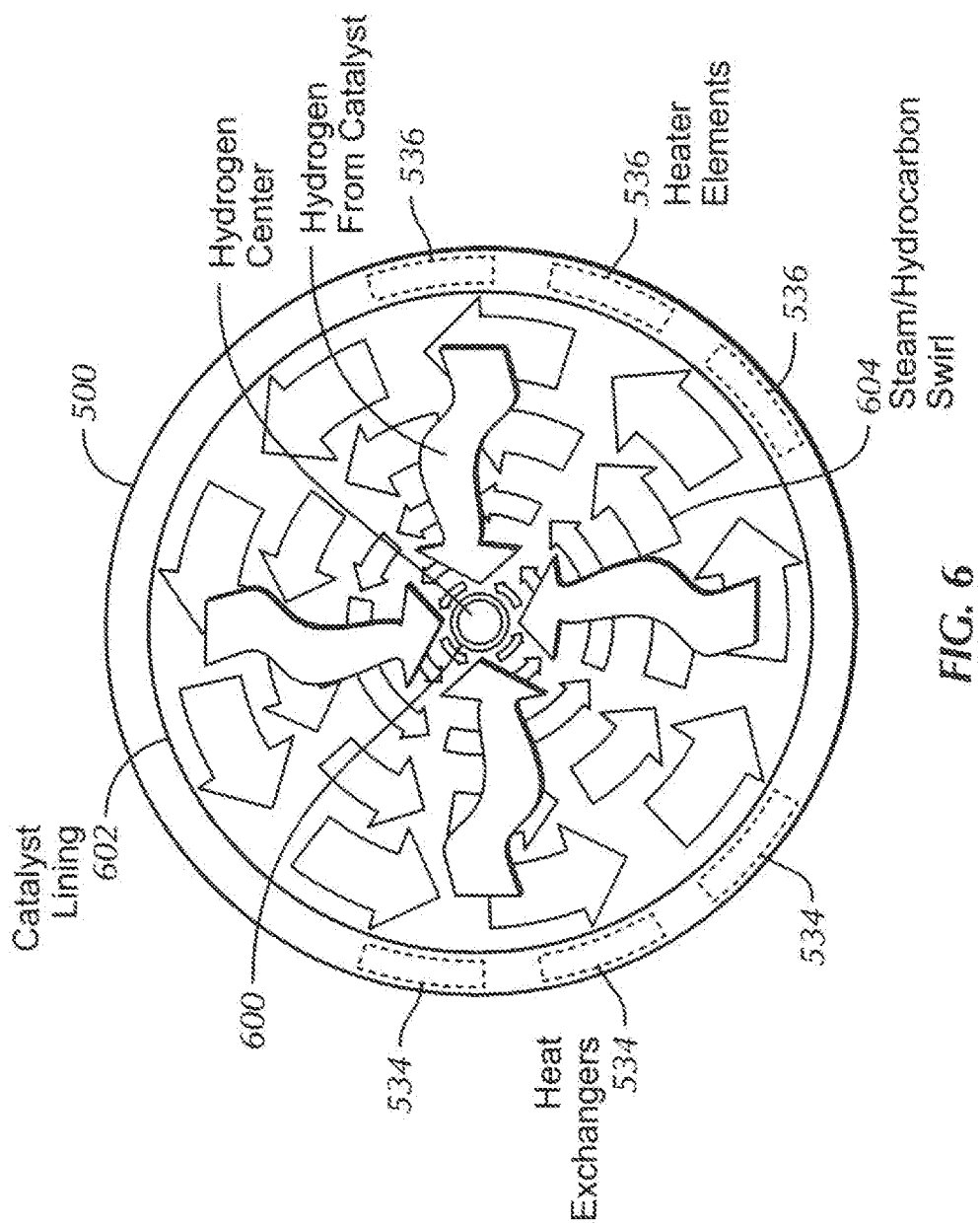
FIG. 6 is a schematic diagram from a transverse view of a vortex tube, illustrating separation.

FIG. 6 illustrates schematically gas separation in the vortex tube 500. The central Hydrogen-permeable tube 600 receives relatively cool Hydrogen while relatively warm Carbon constituents are drawn toward the catalytic lining 602 on the inner surface of the outer wall of the vortex tube 500. Arrows 602 represent the steam/Hydrocarbon swirl of the gases in the vortex tube. FIG. 6 thus illustrates the swirling action of the hydrocarbon steam mixture, the reforming, and the stratification of the syngas with the Hydrogen moving towards the center.

In FIG. 6, the reformer vortex tube is illustrated with the catalyst lining, such as a nickel-based catalyst, with the integrated heaters and heat exchangers proving energy to the reforming reaction. FIG. 6 shows the swirling action of the hydrocarbon steam mixture, the reforming, and the stratification of the syngas with the hydrogen moving towards the center and the heavier gases in contact with the peripheral tube. The hydrocarbon, steam mixture is reformed into syngas through contact with the catalyst-lined tube. This breaks the methane component of the natural gas into carbon monoxide (CO) and $H_2$ gas.

Figure 7:
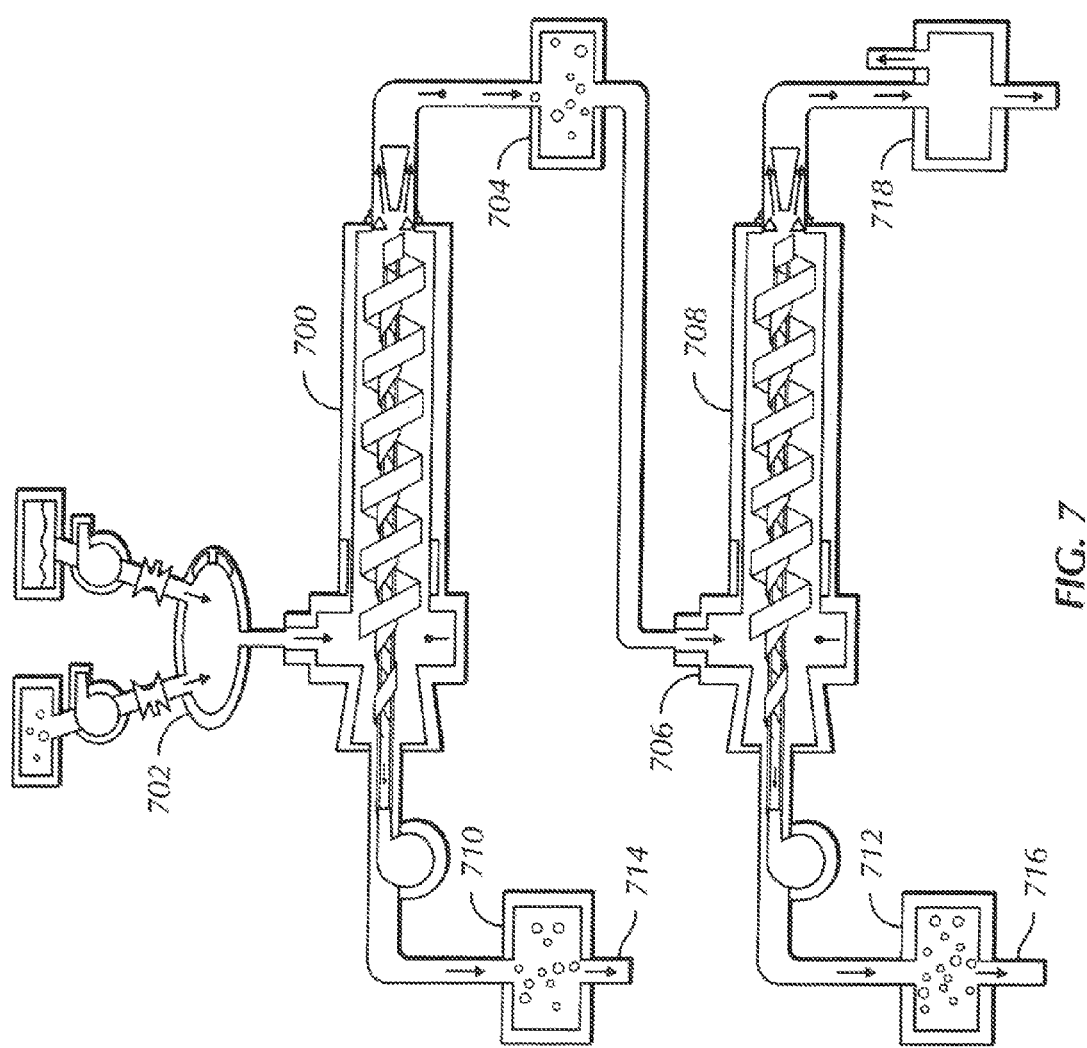
FIGS. 7-9 are additional schematic diagrams of a vortex tube-based Hydrogen reformer systems.
Figure 8:
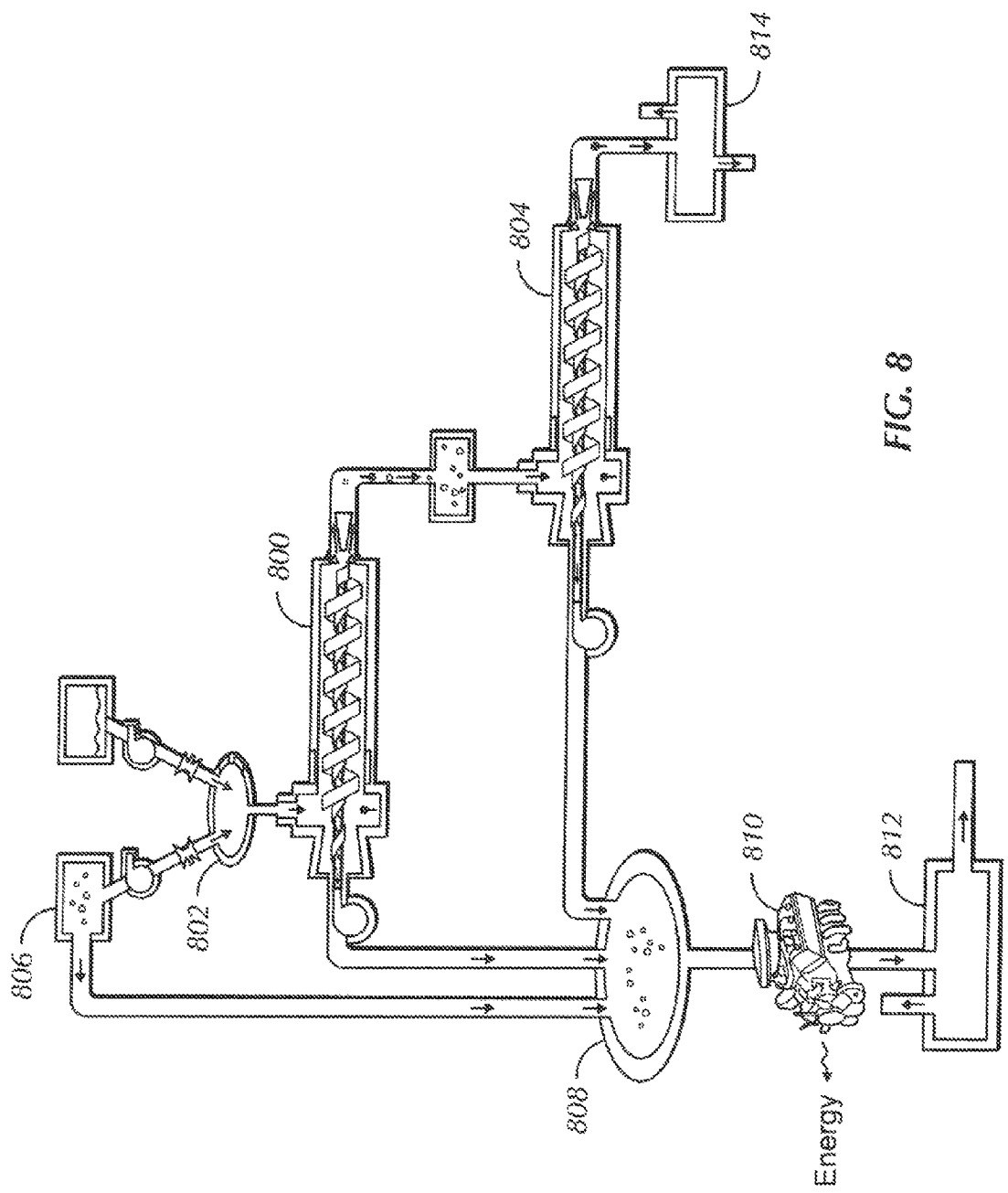
Figure 9:
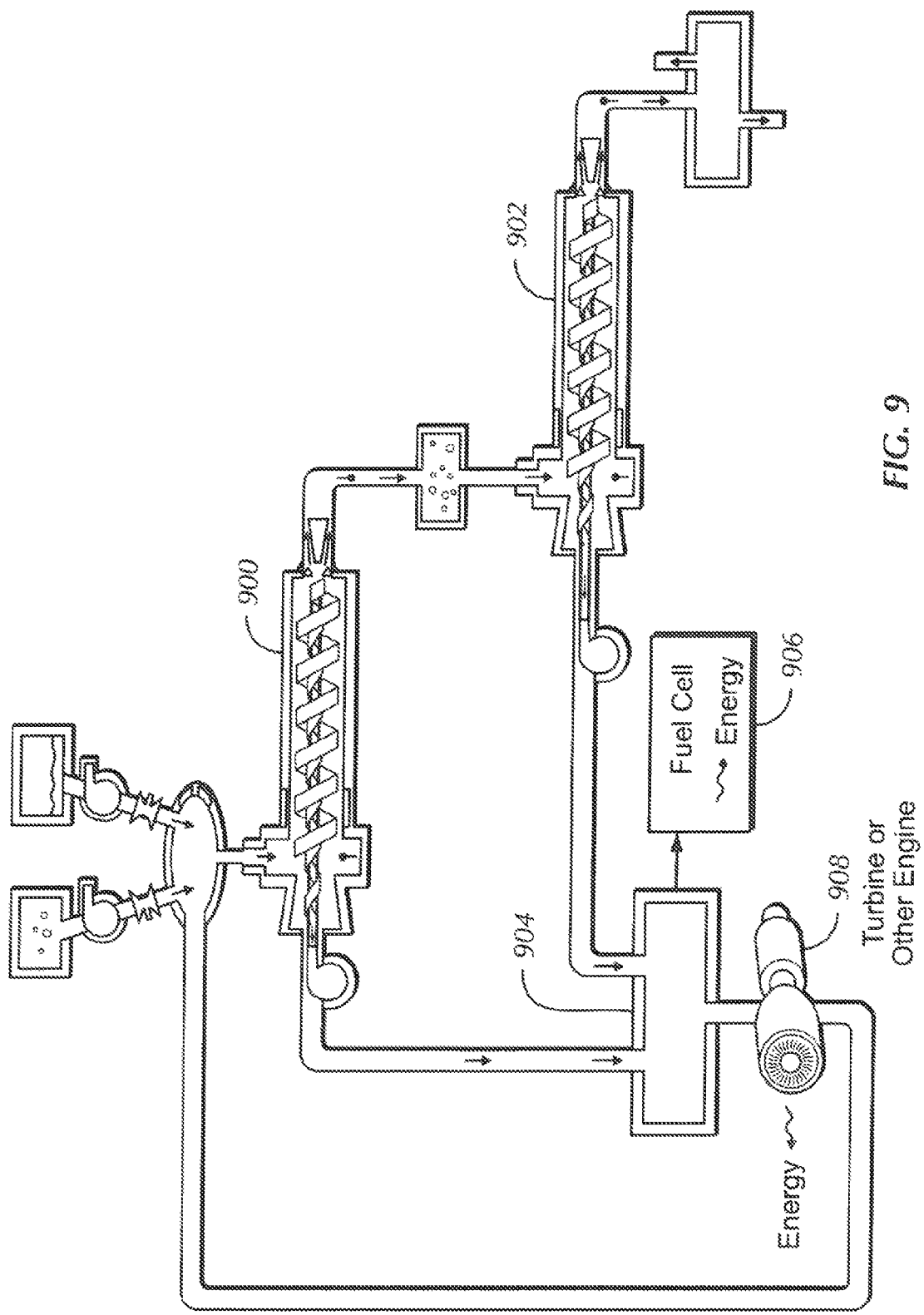

FIGS. 7-9 illustrate additional systems in which vortex tubes are used as reformers for separating Hydrogen from fuel for a variety of purposes, including any of the purposes mentioned above (e.g., injection of Hydrogen into engines) as well as in Hydrogen production for petro chemical installations, and other purposes.

FIG. 7 illustrates an integrated reformer and hydrogen separator connected to an integrated wafer gas shift and hydrogen separator for producing hydrogen and carbon dioxide from hydrocarbons. In FIG. 7, a first stage vortex tube 700 receives a heated fuel and water mixture from a mixer 702, with the relevant sensor, pumping, valving, and heating components disclosed in FIG. 5 also being provided in the example shown and labeled in FIG. 7. However, in contrast to the system of FIG. 5, the Carbon output of the first stage vortex tube 700 in FIG. 7 is sent through a heat exchanger 704 if desired to the inlet 706 of a second stage vortex tube 708. The second stage vortex tube 708 extracts residual Hydrogen in the Carbon output of the first stage vortex tube 700. Effectively, the second stage vortex tube 708 may be regarded as a water gas shift separator. The second stage vortex tube 708 may be internally coated with a catalyzing layer (similar to the layer 226 shown in FIG. 2) that is made of different constituents than the catalyzing layer used to coat the interior of the first stage vortex tube 700. For example, the first stage vortex tube 700 may include nickel in the catalyzing layer whereas the second stage vortex tube 708 may include copper in its catalyzing layer. In specific embodiments, the catalyzing layer of the second stage vortex tube 708 corresponding to the layer 226 shown in FIG. 2 may be composed of Copper Oxide, Zinc Oxide, and Aluminum Oxide. In non-limiting specific examples, the catalyzing layer may be made of 32-33% CuO, 34-53% ZnO, and 15-33% $Al_2O_3$.

The heat exchanger 704 extracts heat from the Carbon output of the first stage vortex tube 700. To this end, the heat exchanger may include a cool water jacket or it may include air cooling fins or other air cooling structure. It may also be a thermoelectric heat exchanger. Preferably, the heat exchanger cools the input fluid to 200° C.-250° C.

In any case, the second stage vortex tube 708, owing to the combination of structure shown, may be regarded as a vortex tube-based WGSR in which residual Hydrogen in the Carbon output of the first stage vortex tube 700 is extracted through the combining of Carbon Monoxide with water vapor from the Carbon output of the first stage vortex tube 700 to produce Carbon Dioxide and Hydrogen (in the form of $H_2$).

The Hydrogen outputs of both vortex tubes 700, 708 can be sent through one or respective Hydrogen filters 710, 712 to further purify the Hydrogen by filtering out non-Hydrogen material. The outputs 714, 716 of the Hydrogen filters may communicate with the intake of an engine such as any of the engines described herein to provide, for instance, Hydrogen-assisted combustion.

A condenser 718 may be provided at the outlet of the second stage vortex tube 708 to separate $CO_2$ from water, with water being sent to the illustrated water tank and $CO_2$ vented from the top of the condenser as shown to atmosphere.

FIG. 8 illustrates an integrated reformer and hydrogen separator connected to an integrated water gas shift and hydrogen separator connected to a hydrogen and hydrocarbon fuel mixer to inject into an engine, turbine, or burner to provide hydrogen assisted combustion.

With greater specificity, FIG. 8 shows a first stage vortex tube 800 receiving a water and fuel mixture from a mixer 802 according to principles above and outputting from its Carbon end input to a second stage vortex tube 804. The difference between the system of FIG. 8 compared to the system of FIG. 7 is that the hydrogen outputs of both vortex tubes 800, 804 in FIG. 8 may be combined with fuel from the fuel tank 806 that also supplies fuel to the inlet of the first stage vortex tube 800 in a fuel/Hydrogen mixer 808. The mixture in the fuel/Hydrogen mixer 808 may be sent to an engine 810 as shown.

A condenser 812 may be provided at the outlet of the engine 810 to separate $CO_2$ from water, with water being sent to the illustrated water tank and $CO_2$ vented from the top of the condenser as shown to atmosphere. A separate condenser 814 may be provided at the outlet of the second stage vortex tube 804 according to prior disclosure with respect to FIG. 7. In some embodiments the condensers may be implemented by a single condenser.

FIG. 9 illustrates an integrated reformer and hydrogen separator connected to an integrated water gas shift and hydrogen separator powering a hybrid fuel cell system. With greater specific, as shown in FIG. 9, a system includes first stage and second stage vortex tubes 900, 902 substantially as described above, but with the Hydrogen outputs of each vortex tube being supplied to a Hydrogen receptacle 904, which communicates with a fuel cell 906 and engine 908 to provide Hydrogen to both. The fuel cell 906 may establish the Hydrogen receptacle 904, in which case excess Hydrogen not used by the fuel cell is sent to the engine 908. Both the engine 908 and fuel cell 906 can be used to provide propulsive power to a vehicle.

Figure 10:
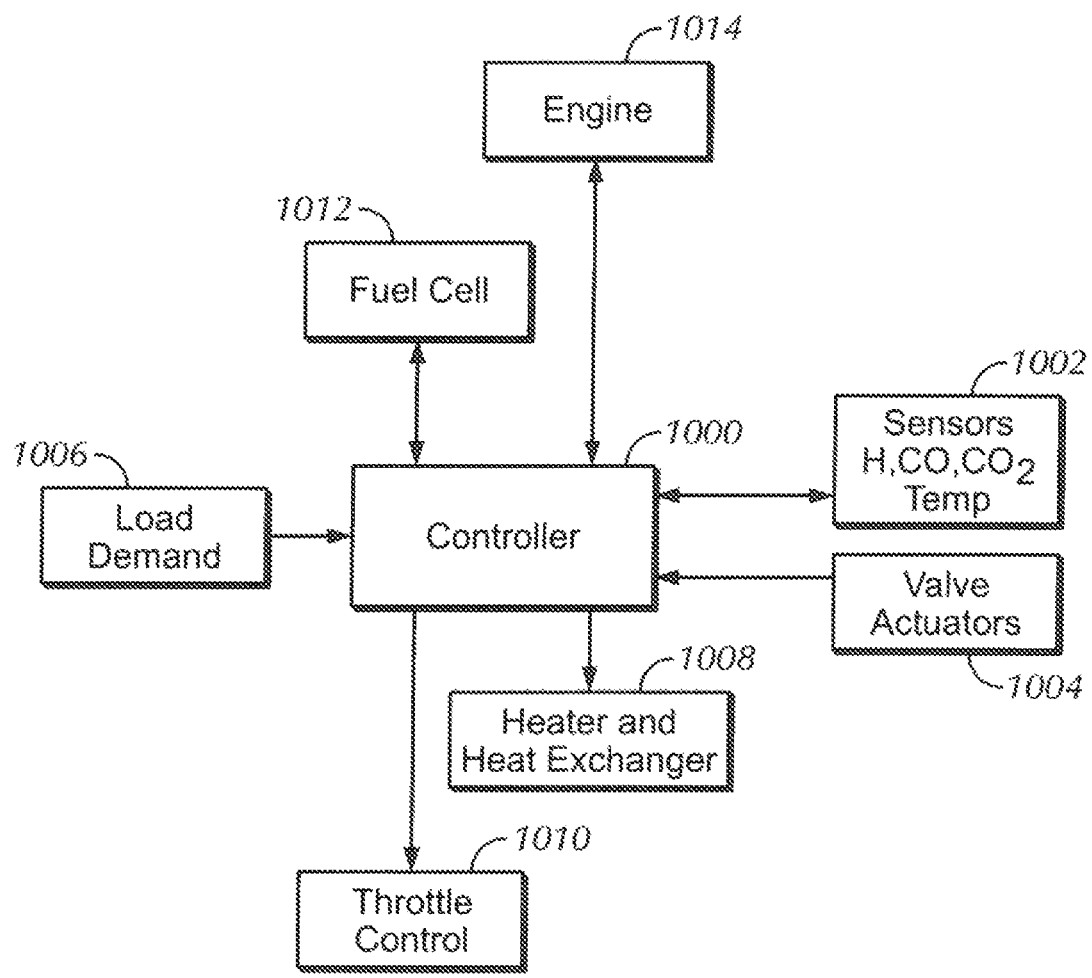
FIG. 10 is a block diagram of an example electrical component subsystem for supporting the vortex tube systems shown in the drawings.

FIG. 10 illustrates an example processing circuit for controlling the pumps, valves, and other components in the preceding figures. A controller 1000 such as a processor receives input from any of the above-described sensors (shown at 1002) and may also receive valve position signals from the actuators of any of the above-described valves (shown at 1004) as well as a demanded load signal from a demanded load signal source 1006 such as a vehicle accelerator. The controller uses the inputs to control one or more of the heat exchangers and attendant components (shown at 1008) and throttle valves (shown at 1010). The controller 1000 also communicates with or established by control components in any of the above-described fuel cells and engines (shown at 1012 and 1014, respectively).

Thus, a control system herein may include computers and processors connected over a network such that data may be exchanged between the client and server components. The client components may include one or more computing devices such as engine control modules (ECMs), portable computers such as laptops and tablet computers, and other mobile devices including smart phones. These computing devices may operate with a variety of operating environments. For example, some of the client computers may employ, as examples, Linux operating systems, operating systems from Microsoft or a Unix operating system, or operating systems produced by Apple Computer or Google, or VxWorks embedded operating systems from Wind River.

Information may be exchanged over a network between the components. To this end and for security, components can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines smell as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires. Such connections may include wireless communication connections including infrared and radio.

Figure 11:
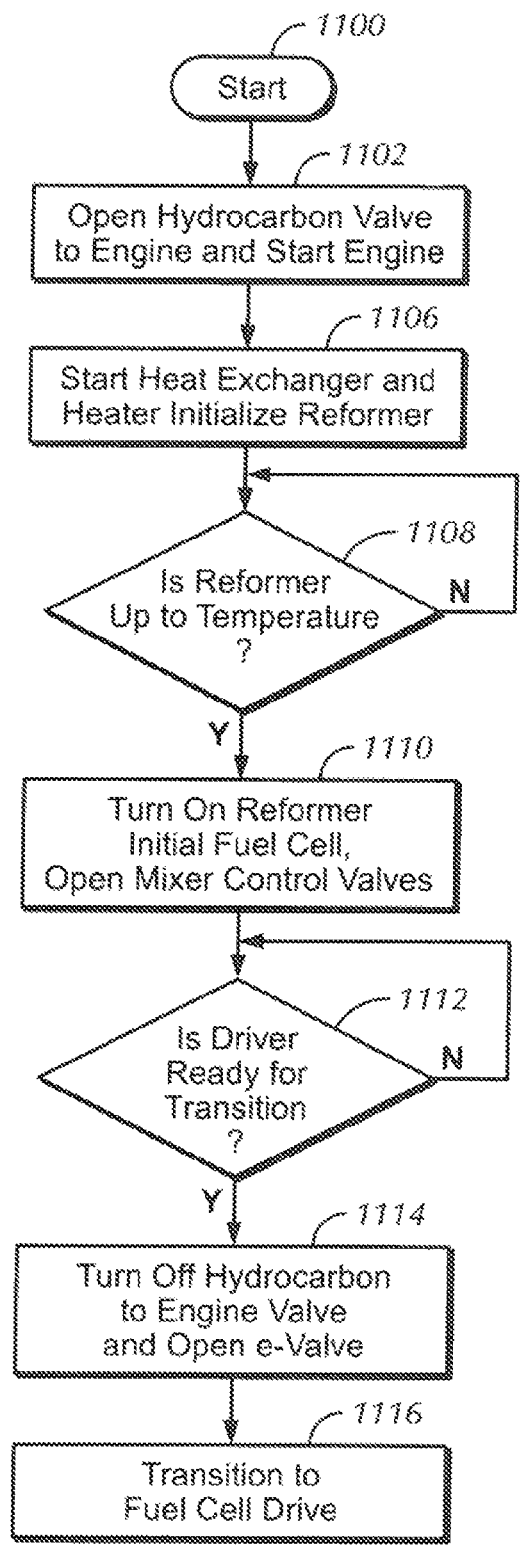
FIG. 11 is a flow chart of an example process flow of the vortex tube systems shown in the drawings, illustrating logic that may be executed by a processor.

The operating logic of FIG. 11 is specifically directed to the system shown in FIG. 5, although its principles may apply where relevant to the other systems shown herein.

The logic commences at state 1100 and proceeds to block 1102, wherein the hydrocarbon fuel valve 550 is opened to port hydrocarbon fuel to the engine 540 pursuant to starting the engine. The heat exchanger 529 is started and the electric heaters of the mixer 502 and vortex tube 500 are energized at block 1106 to initialize the reforming of the vortex tube. Once the heat exchanger is hot enough to supply heat to the mixer and vortex tube, the heat from the heat exchanger may replace the heat from the electric heaters, which may be deenergized.

Decision diamond 1108 indicates that one or more of the sensors described above embodied as a temperature sensor is sampled and when its signal indicates that the vortex tube has reached a sufficient temperature for reforming the hydrocarbon from the mixer 502, the vortex tube is actuated at block 1110, and the fuel cell 520 initialized. Input may be received at decision diamond 1112 indicating that the driver is ready to transition from hydrocarbon propulsion from the engine 540 to electric propulsion from the fuel cell 520, at which point the logic moves to block 1114 to shut the fuel valve 550 and transition to electric drive at block 1116.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

While the particular systems and methods are herein shown and described in detail, the scope of the present application is limited only by the appended claims.

What is claimed is:

1. An assembly, comprising:
   at least one vortex tube having an inlet and at least a Hydrogen outlet; and
   at least one reformer mechanism associated with the vortex tube to remove Hydrogen from Carbon in molecules of hydrocarbon fuel input to the inlet, the reformer mechanism including a catalytic constituent inside the vortex tube; and heated water vapor injected into the vortex tube along with the hydrocarbon fuel, wherein the vortex tube comprises:
   a swirl chamber, the inlet of the vortex tube being into the swirl chamber, the vortex tube comprising a main tube segment communicating with the swirl chamber and having a Carbon outlet different from the hydrogen outlet, the inlet being between the Hydrogen outlet and the Carbon outlet;
   the heated water vapor injected into the vortex tube along with the hydrocarbon fuel being received from a mixing reservoir in fluid communication with a water reservoir and a hydrocarbon fuel reservoir;
   the vortex tube being configured to generate hydrogen by reforming the hydrocarbon in the hydrocarbon fuel received with heated water vapor.

2. The assembly of claim 1, comprising at least one engine having an input port in fluid communication with the hydrogen outlet of the vortex tube, wherein a fuel intake of the engine is in fluid communication with the Carbon outlet different from the hydrogen outlet of the vortex tube.

3. The assembly of claim 2, wherein the Carbon outlet different from the hydrogen outlet is juxtaposed with an inside surface of a wall of the main tube segment.

4. The assembly of claim 1, comprising at least one hydrogen-permeable tube disposed centrally in the main tube segment and defining the hydrogen outlet at one end of the hydrogen-permeable tube.

5. The assembly of claim 1, comprising plural vortex tubes arranged in a toroidal configuration, a first vortex tube in the plural vortex tubes defining the inlet of the vortex tube and providing fluid to an inlet of a next vortex tube in the plural vortex tubes.

6. The assembly of claim 1, wherein the inlet of the vortex tube is in fluid communication with an exhaust of an engine.

7. The assembly of claim 1, wherein the mixer injects into the vortex tube a steam/hydrocarbon mixture, the vortex tube being configured such that the steam/hydrocarbon mixture enters the main tube segment tangentially, the main tube segment defining a tube axis, an input axis of the swirl chamber not being parallel to the tube axis.

8. The assembly of claim 1, wherein an input of the main tube segment receiving a steam/hydrocarbon mixture from the swirl chamber is at an end of the main tube segment.

9. A method comprising:
   reforming hydrocarbon fuel using at least one vortex tube;
   the reforming including removing Hydrogen from Carbon-based constituents in molecules of the hydrocarbon fuel;

separating the Hydrogen from the Carbon-based constituents using the vortex tube to render a Hydrogen stream substantially free of Carbon; and providing the Hydrogen stream to a hydrogen receiver, wherein the vortex tube comprises:

a catalytic constituent inside the vortex tube;

a swirl chamber, the inlet of the vortex tube being into the swirl chamber, the vortex tube comprising a main tube segment communicating with the swirl chamber and having a Carbon outlet different from the hydrogen outlet, the inlet being between the Hydrogen outlet and the Carbon outlet;

the hydrocarbon fuel being received tangentially into the main tube segment in a steam/hydrocarbon mixture from a mixing reservoir in fluid communication with a steam reservoir and a hydrocarbon fuel reservoir;

the vortex tube being configured to generate hydrogen by reforming the hydrocarbon in the steam/hydrocarbon mixture.

10. The method of claim 9, comprising reforming exhaust from an engine using the vortex tube, the engine receiving the Hydrocarbon stream.

11. The method of claim 10, comprising providing the Carbon-based constituents to the engine.

12. The method of claim 10, wherein the engine is a diesel engine.

13. The method of claim 9, wherein the main tube segment defines a tube axis, an input axis of the swirl chamber not being parallel to the tube axis.

14. The method of claim 9 wherein an input of the main tube segment receiving the steam/hydrocarbon mixture from the swirl chamber is at an end of the main tube segment.

\* \* \* \* \*